(12) United States Patent
Eilam et al.

(10) Patent No.: US 8,655,997 B2
(45) Date of Patent: Feb. 18, 2014

(54) HIERARCHICAL RESOURCE MANAGEMENT FOR A COMPUTING UTILITY

(75) Inventors: Tamar Eilam, New York, NY (US); Guerney D. H. Hunt, Yorktown Heights, NY (US); Sandra D. Miller, Winchester (GB); Lily B. Mummert, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 10/587,618

(22) PCT Filed: Jan. 30, 2004

(86) PCT No.: PCT/US2004/002696
§ 371 (c)(1),
(2), (4) Date: Dec. 5, 2007

(87) PCT Pub. No.: WO2005/083576
PCT Pub. Date: Sep. 9, 2005

(65) Prior Publication Data
US 2008/0216082 A1    Sep. 4, 2008

(51) Int. Cl.
*G06F 15/16* (2006.01)
*G06F 12/00* (2006.01)

(52) U.S. Cl.
USPC .......................................... 709/223; 707/821

(58) Field of Classification Search
USPC .............................................. 709/217–229
See application file for complete search history.

(56) References Cited

U.S. PATENT DOCUMENTS

| | | | |
|---|---|---|---|
| 5,649,185 A * | 7/1997 | Antognini et al. | 1/1 |
| 5,889,956 A * | 3/1999 | Hauser et al. | 709/226 |
| 5,923,845 A * | 7/1999 | Kamiya et al. | 709/206 |
| 6,141,754 A * | 10/2000 | Choy | 726/1 |
| 6,460,082 B1 * | 10/2002 | Lumelsky et al. | 709/226 |
| 6,466,570 B1 * | 10/2002 | Low et al. | 370/352 |
| 6,708,187 B1 * | 3/2004 | Shanumgam et al. | 1/1 |
| 6,847,968 B2 * | 1/2005 | Pitts | 1/1 |
| 7,483,958 B1 * | 1/2009 | Elabbady et al. | 709/217 |
| 2002/0091533 A1 * | 7/2002 | Ims et al. | 705/1 |
| 2002/0099842 A1 * | 7/2002 | Jennings et al. | 709/231 |
| 2004/0039754 A1 * | 2/2004 | Harple, Jr. | 707/104.1 |
| 2006/0075503 A1 * | 4/2006 | Bunker et al. | 726/25 |

* cited by examiner

*Primary Examiner* — Afshawn Towfighi
(74) *Attorney, Agent, or Firm* — Cantor Colburn LLP; Vazken Alexanian

(57) ABSTRACT

This invention provides for the hierarchical provisioning and management of a computing infrastructure which is used to provide computing services to the customers of the service provider that operates the infrastructure. Infrastructure resources can include those acquired from other service providers. The invention provides architecture for hierarchical management of computing infrastructures. It allows the dynamic provisioning and assignment of resources to computing environments. Customers can have multiple computing environments within their domain. The service provider shares its resources across multiple customer domains and arbitrates on the use of resources between and within domains. The invention enables resources to be dedicated to a specific customer domain or to a specific computing environment. Customers can specify acquisition and distribution policy which controls their use of resources within their domains.

14 Claims, 15 Drawing Sheets

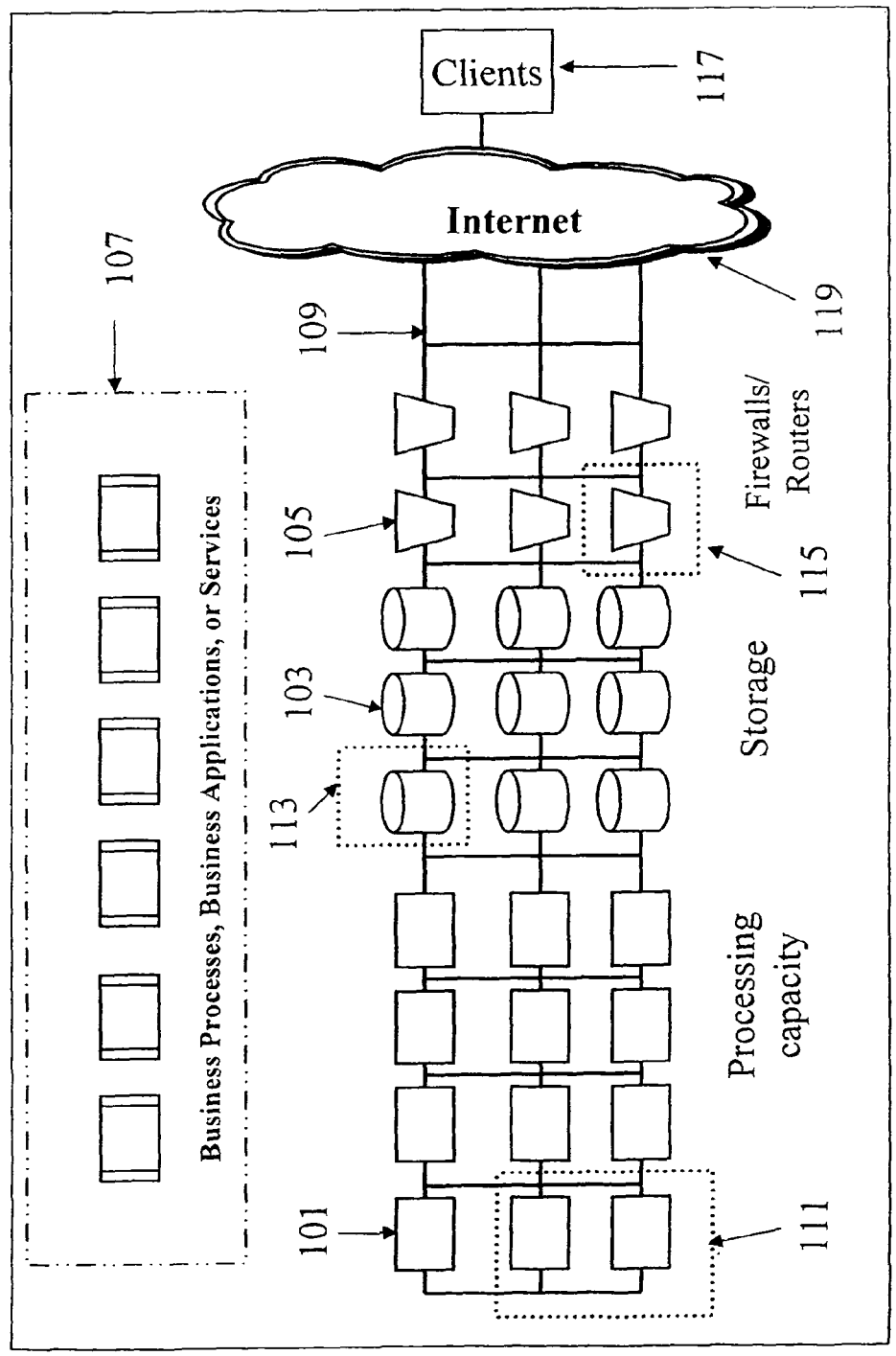

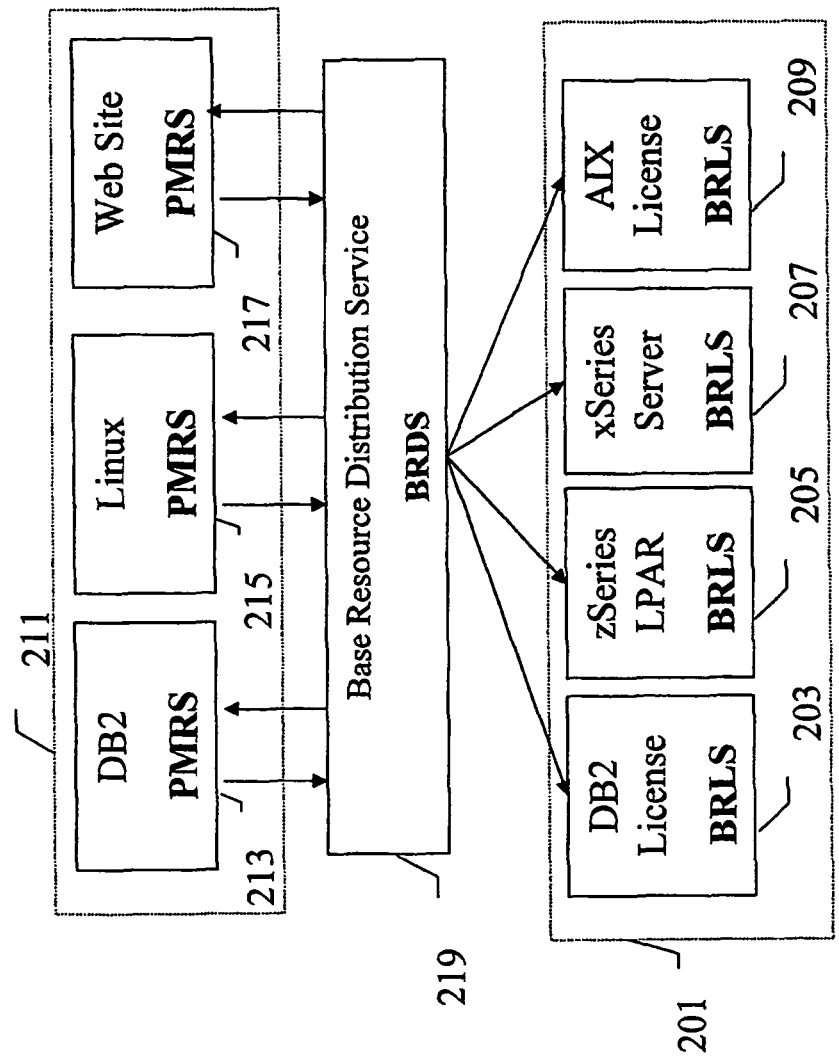

Fig. 6

HIERARCHICAL RESOURCE MANAGEMENT FOR A COMPUTING UTILITY

CROSS REFERENCE AND PRIORITY

This application filed under 35 USC 371, is cross-referenced with, and claims priority from, International Patent Application PCT/US2004/002696 filed on Jan. 30, 2004, and published in English with Publication No. WO 2005/083576 on Sep. 9, 2005, under PCT article 21(2); the contents of which in its entirety are herein incorporated by reference.

The present application is also cross-referenced and claims priority from, International Patent Application PCT/IB2004/002637 filed on Jan. 30, 2004, and published in English with Publication No. WO 2005/081672 on Sep. 9, 2005, under PCT article 21(2) entitled "Componentized Automatic Provisioning and Management of Computing Environments for Computing Utilities", and filed under PCT article 21(2), even dated herewith, and which is included herein by reference in entirety for all purposes.

FIELD OF THE INVENTION

The present invention is directed to provisioning and management of resources in a computing utility, which uses the resources to provide computing services to customers. It is more particularly directed to hierarchical resource management for the computing utility.

BACKGROUND

A hosted center provides computing services to multiple customers. Each customer is allocated a subset of the service provider's infrastructure resources, such as servers, to meet its needs. Customer needs change over time, and in particular, peak demands for resources can exceed average demands by orders of magnitude. A simple static allocation of resources to satisfy peak demand leaves resources underutilized. Reconfiguring infrastructure resources dynamically, in response to customer needs, demands prompt attention from administrative personnel and could require moving hardware, increasing both operational costs and the risk of failing to provide adequate service. The problem for the hosted center is how to respond quickly to changes in customer needs such that infrastructure resources and staff are employed in an efficient and cost effective way. Computing utilities attempt to address this problem by automating the creation and management of multiple computing services on shared dynamically allocatable infrastructures.

Previous work in computing utilities varies in the types of services that are offered, the resources that are used, and the extent to which operation is automated. Operations subject to automation are wide ranging, and include creating services, deploying a service for a customer, modifying the set of resources used to provide the service, and incorporating new resource instances and types into the hosted center and its services.

A previous system automated the provisioning of front end servers in web sites based on metrics such as server load and response time. It included a component that discovered server and network topology automatically. Another system provided a variety of multi-tier web sites in which pre-configured servers could be allocated to different tiers automatically based on metrics such as server load. Yet another system also allocated server resources in response to server load, but modeled both the value of allocating resources to each customer and the cost of employing those resources, with an emphasis on energy cost. More recent work includes allocation of other resource types such as memory and storage, and allocation of servers for general use.

At the application layer some systems have a framework for deployment and management of distributed applications. An application is described as a collection of related, reusable components, which may represent resources or subsystems. The description includes dependency information to ensure that, for example, components are started in the correct sequence. Once deployed, applications may be monitored, and actions may be specified in case of component or resource failures, such as automatic fail over or restart. Such a system is not used for low level resource configuration tasks such as installing operating systems on servers, but for higher level application specific configuration.

A growing number of industrial products aim to provide multi-tier applications over a physical infrastructure consisting of a variety of resources, such as those from Hewlett Packard, ThinkDynamics, Sun Microsystems, and Jareva. They vary in many respects, such as the types of resources provided (e.g., servers and storage); specific operating systems and middleware supported; assumptions and characteristics of the network infrastructure (e.g., whether or not network isolation is provided via VLAN); level of monitoring support (e.g., resource usage, failure detection, SLA, threshold based alerting); support for resource discovery; support for modifying service resources once deployed; whether modifications can occur automatically (e.g., triggered by SLAs); and the extent to which the products can or must be customized to fit preexisting hosted center infrastructures.

SUMMARY OF INVENTION

This invention provides methods, apparatus, systems and architectures for a hierarchical provisioning and management of a computing infrastructure, used to provides service oriented, or utility computing. It is useful for hosted environments. It is often provided to customers of a service provider who owns an infrastructure. It allows the dynamic provisioning and assignment of resources to computing environments.

An aspect of the present invention is to provide an element of a computing utility that operates in an environment that possesses the following characteristics. Together, these characteristics generalize the environments studied in previous work.

Another aspect of the present invention is to provide for automatically provisioning and managing resources for a computing utility. A computing utility could be used by a corporation, a service provider, or an individual. This invention allows the sharing of resource within sets of customers and allows for restricting resources to specific customers. It allows customers to offer one or more services composed of managed resources to their clients. Managed resources may be assigned to customers or domains on demand. It also allows resources to be hierarchically managed.

In an example embodiment of a method according to the present invention, the method comprises the step of providing hierarchical management of at least one domain for an entity. The step of providing hierarchical management including: obtaining a hierarchical representation of the at least one domain, the representation including: a list of computing environments to be managed, at least one policy controlling acquisition of at least one resource from resource libraries for the at least one domain, and any sub-domains within the at least one domain; and instantiating the representation.

In an example embodiment of an architecture according to the present invention, the architecture for a computing utility comprises an apparatus to provide at least one service for a plurality of clients. The apparatus comprises: a Base Resource Distribution Service to allocate resources to the at least one service; the Base Resource Distribution Service having at least one collector; at least one Provisioned and Managed Resource Service coupled to the Base Resource Distribution Service to provision and manage the resources for the at least one service; and at least one Base Resource Library Service coupled to the Base Resource Distribution Service to provide reservation and allocation of resources.

BRIEF DESCRIPTION OF THE DRAWINGS

These, and further, aspects, advantages, and features of the invention will be more apparent from the following detailed description of a preferred embodiment and the appended drawings wherein:

FIG. 1 shows the components of a Hosted Environment;
FIG. 2 shows the components in a computing utility management system in accordance with the present invention;
FIG. 4 A shows applications allocated to a unit of a company in accordance with the present invention;
FIG. 4 B shows how the applications of FIG. 4A can be structured for provisioning in accordance with the present invention;
FIG. 6 shows the association of resource pools to collections in accordance with the present invention.

DETAILED DESCRIPTION OF THE INVENTION

Figure 1A:
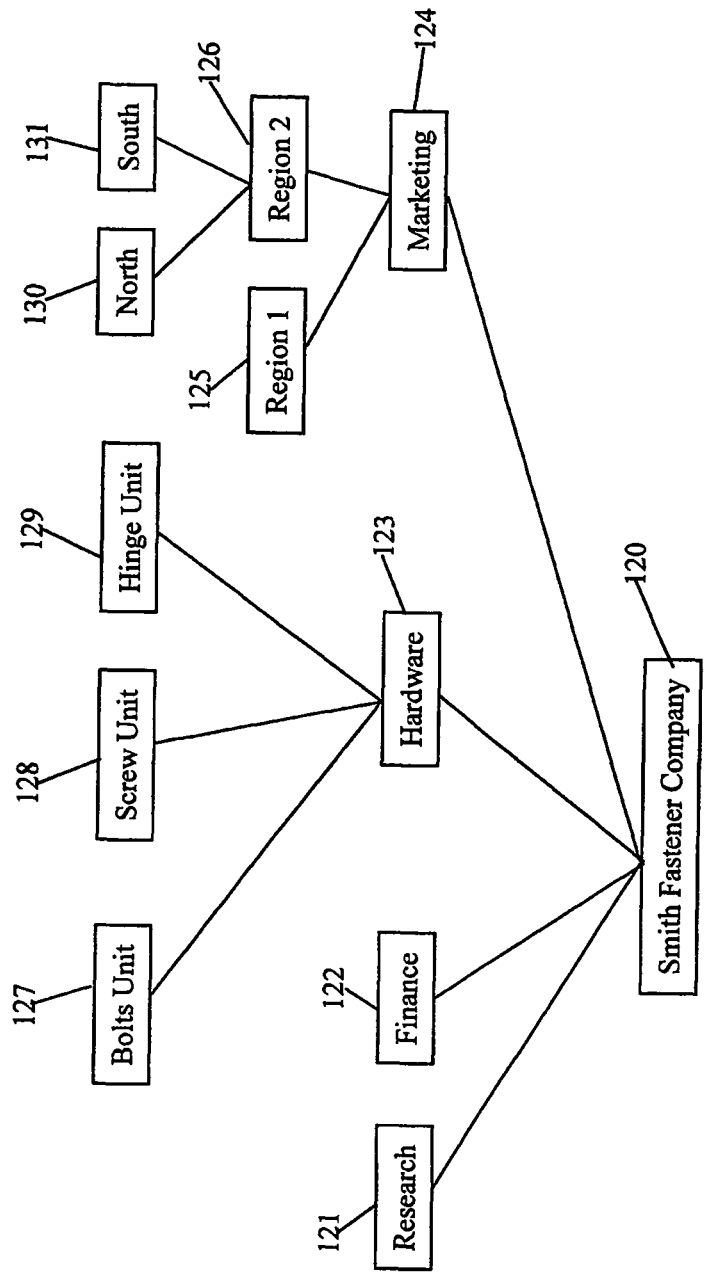
FIG. 1A shows an example structure of a company.

This invention provides methods, apparatus, systems and architectures for hierarchical provisioning and management of a computing infrastructure which is used to provides service oriented, or utility computing, to the customers of the service provider who owns the infrastructure. In this way hosted environments can acquire resources from other hosted environments, etc. The invention provides an architecture for hierarchical management of computing infrastructures which included arbitration, provisioning and management. It allows the dynamic provisioning and assignment of resources to computing environments. Customers can have multiple computing environments within their domain. The computing utility shares its resources across multiple customer domains and arbitrates on the use of resources between and within domains. The invention enables resources to be dedicated to a specific customer domain or to a specific computing environment. Customers can specific acquisition and distribution policy which controls their use of resources from the utility within their domains.

The present invention is an element of a computing utility that generally, but not necessarily, operates in an environment that possesses one or more of the following characteristics. Together, these characteristics generalize environments studied in previous work.

First, resources may be allocated to customers in combinations which are heterogeneous, may be interdependent, and vary over time.

Second, the services provided to each customer may be different. For example, one customer may be provided resources for a web site, and another for a scientific computing cluster. Resource types, quantities, dependencies, and allocation patterns will thus vary between customers.

Third, the level of service provided to each customer may be different. This means that evaluating the quality of a resource allocation to a customer considers both the type and level of service.

Fourth, the resource infrastructure varies between service providers. Further, for a given service provider, the infrastructure varies over time. These variations can be a result of upgrades or additions to the physical infrastructure, engaging the services of another provider, or inclusion of additional resources when idle or at certain times of day, or removal of resources which are no longer needed.

Fifth, resources may be allocated in advance, or reserved. A reservation may be accepted even if there are not sufficient resources currently available in the infrastructure to fulfill it, based on the expectation that additional resources will be acquired in time for allocation.

Sixth, customers may want to share resources within an organization by subdividing their allocations and having the service provider manage the subdivisions, such as to departments.

Seventh, customers may want to supply resources which they currently own to be managed by the service provider (i.e., the customer outsources the management of its resources to the service provider), which can only be used for their purposes. This requirement imposes constraints on where resources may be allocated.

Eighth, customers may wish to specify policies which govern the management and operation of their resources. These policies are to be implemented by the computing utility.

Finally, different service providers may have different objectives in mind when allocating resources to customers, such as maximizing profit, availability, or performance.

This invention is also useful as a part of an apparatus for automatically provisioning and managing resources for a computing utility. A computing utility could be used by a corporation, a service provider, or an individual. This invention allows the sharing of resource within sets of customers and allows for restricting resources to specific customers. It allows customers to offer one or more services composed of managed resources to their clients. Managed resources may be assigned to customers or domains on demand. It also allows resources to be hierarchically managed.

FIG. 1 illustrates a Hosted Environment where the present invention runs. This environment is made up of processors 101, storage 103, firewalls 105, and software 107. The software 107 can be operating systems, middleware or applications. In FIG. 1 the software 107 is represented as Business Processes, Business Applications, or Services. All of the available software has been pre-configured into these elements. In fact it is the purpose of this invention to enable the dynamic reconfiguration of the hardware and software components into new or existing services as needed. This type of environment can exist within a large company or it can be offered by an ISP or ASP as a basis for service. Returning to the detailed description, the hardware resources are connected by a network as indicated by the grid of lines 109 interconnecting all of these resources. This network may be configure into one or more tiers, where each tier is separated by a router 105 or firewall 105. The configuration of the tiers within the network may be static or dynamic. When a network is statically configured it is not possible without human (or mechanical) intervention to move a resource between tiers in the network. With a dynamic configuration, resources can be moved between different tiers under the control of an infrastructure, such as the one being described in this invention, or an operator working at a console. Within each tier Resources can be arbitrarily grouped into units. This can be done by using mechanisms such as Virtual LANs. Software resources are assigned to physical resources by the controlling infrastructure.

In this environment a subset of the resources are assigned to the management infrastructure 111, 113, & 115. In FIG. 1 these resources are indicated by a dotted line surrounding them. The resources assigned to the management infrastructure run the Resource Management Software described in this invention. This software manages the rest of the resources. The resources used for the management infrastructure are not assigned to clients 117 of the hosted environment. The managed resources are assigned to clients 117 as necessary. It is expected that clients 117 will primarily receive service by connecting to the hosted environment thought the Internet 119. However, clients 117 can receive service if they are connected by any means to the hosted environment. For example, they could have a direct connection to a managed resource, they could be connected to the same network as the managed resources, they could have a VPN connection to the managed resource, or they could have a VPN connection to the network containing the managed resources. Clients 117 have no view to the infrastructure; they only see the applications or services that they are receiving from the hosted environment.

The management infrastructure assigns resources to each supported service as needed. The need is determined by the demand on the service in accordance with SLAs, contract, or other agreement that authorized the service to operate in the hosted environment. Individuals or organizations that wish to offer services will have agreements with the provider of the hosted environment. Returning to FIG. 1, the processors 101 may have direct attached storage that would be managed as part of managing the processor. Storage 103 in this Figure refers to any form of storage server that can be network attached. The processors can also represent some complex function like a database server or a video server. The degree to which a resources is divided into smaller functions for management is dependent on the owner of the infrastructure. Even if a complex resource such as a database server can be broken down into smaller components, the owner of the resource will determine how it is represented within the management infrastructure. This feature allows the invention to use resources that are not local to the hosted environment. The invention assumes that the resources are securely interconnected with adequate performance. However, the network which connects the resource represents a logical connection. Any infrastructure, such as a VPN, which allows an adequate degree of security, performance, and control over a resource, can be used to connect resources into the hosted environment. Consequently the hosted environment as depicted in FIG. 1 could itself be distributed world wide. The Internet in this picture represents a logical placement the Internet can be used to dynamically add resources to the hosted environment.

A domain is an organizational unit within a customer for which services are provisioned. An organization may have multiple sub domains, division, units, or departments within it which also utilize the service provider. A sub domain is also a domain and the domains of an organization are form a tree. An organization can have multiple trees of domains which are not connected. For the purposes of this invention, we consider those to be multiple organizations. The root domain is the highest domain or the base of the domain tree for an organization. FIG. 1A shows the domains within a customer where services can be provided. In FIG. 1A the main company, or root domain, is Smith Fastener Company 120, all other parts of this company are subdivisions, or sub-domains, of Smith Fastener. Smith Fastener has four main divisions, Research 121, Finance 122, Hardware 123, and Marketing 124. The hardware and marketing division have additional units, or sub domains, within each of them. Hardware is divided into Bolts 127, screws 128, and hinges 129. Marketing has two regions Region 1, 125 and Region 2, 126. Region 2 is further divided into North 130 and South 131. It is an object of the present invention to allow service providers to provide computing services to the various domains, units, and/or division of any company, such as the Smith Fastener company. Any domain or sub-domain may then subscribe to the computing services provided. This invention assumes that for provisioning purposes the company can be structured into a domain tree. Further any arbitrary tree can be supported. As will be described later, the domain tree controls the sharing of resources for the purposes of provisioning between the various applications that are used by a company. This invention does not require that the resource sharing tree exactly map to the corporate structure. Any arbitrary resource sharing tree can be used. For illustrative purposes we will use one that maps to the structure of an organization, Smith Fastener Company 120.

Within an organization, each domain, division, or unit has its own employees. This invention does not restrict who (which employees of the corporation) within a corporation can use the computing services. Eligibility to use a computing environment is controlled by the administrative policies within the corporation. User Ids, passwords, and authorization are controlled by the corporation. For example, all of the application could use a common authentication and authorization mechanisms, each application could have its own, or any combination in between. The provisioning of access control is part of the PMRS. The use, (user who are allowed to access or use the applications) of computing services is independent of the structure used to provision resources to the applications.

In this environment there are multiple ways to divide the roles and responsibilities for utilizing this invention. In one such division there is an infrastructure provider who owns the hosted environment described in FIG. 1; one or more Service Providers offering some service on using the hosted environment; and one or more clients of the Service Provider. Note that the service provider is also a customer of the infrastructure provider. In another such division a company (or entity) may contract with an infrastructure provider for services, outsourcing the management of its infrastructure. In this case the company is utilizing this invention to manage the services provided within itself. In another such division the infrastructure provider and service provider could be the same. Further there are entities that develop the services that are offered. They could be separate, such as an independent software vendor (ISV), or part of one or more of the previously named entities. An entity who wants to offer a service that is managed by this invention on some infrastructure provides a description of that service to the infrastructure. This description can be abstract or concrete and includes the organization of the service, an indication of the service to be provided and the policies which control the operation of the service.

FIG. 2 shows a high level view of a computing utility. There are three layers of components. The top layer represents the services which are provisioned, called computing environments. A computing environment includes hardware and software resources such as servers, operating systems, applications, and middleware. Each computing environment has a service which is invoked to provision and manage its resources called the Provisioned and Managed Resource Service (PMRS). The PMRS is described in detail in a separate invention entitled "Componentized Automatic Provisioning and Management of Computing Environments for Computing Utilities", having Ser. No. 10/587,615. The bottom layer represents the resources of the hosted center available to its customers. A base resource is a resource that is atomic; it is not broken down into other resources. Each base resource type has a service that provides reservation and allocation of instances of that resource type, called the Base Resource Library Service (BRLS). The definition of base resource is up to the service provider. Therefore, a BRLS can provide a simple resource such as a software license or a complex resource such as an operating system installed and running on a hardware platform. Adding, removing, or modifying a base resource changes the overall capacity of the system. This invention assumes that both the number and types of the base resources change over time. Base resources are represented by a set of Base Resource Library Services (BRLS) 201. FIG. 2 shows four types of base resources: DB2 license 203, zSeries LPAR 205, xSeries Server 207, and AIX license 209. The BRLS provides operations such as cataloging, check out (allocation), check in (deallocation), and reservation. The interfaces to a BRLS 203, 205, 207, 209 are described in more detail in FIG. 3.

A composite resource is built out of one or more other resources (including other composite resources) to perform a specified function. A composite resource may have a set of dependencies associated with it. An example of a composite resource is a web site. It may be composed of some number of front-end servers, back end servers, a load balancer, a set of IP addresses for the servers, web server software, database software, and licenses associated with the software. The set of base resources used to implement the function of a composite resource can change over time, though not all composite resources may have this capability. The computing environment is a type of composite resource.

Associated with each computing environment is software that provisions and manages the resources used to provide the service, called the Provisioned and Managed Resource Services (PMRS) 211. Every resource type, including composite resources, has a PMRS which encapsulates the knowledge of how to create a resource of that type, and how to manage an instance of the resource. Provisioning refers to the act of allocating a resource to a computing environment and configuring it for use within the service. Provisioning actions may include assembling base resources into composites, configuring network devices, installing operating systems, application software, monitors, and user accounts. Managing the resource may include such actions as requests for adding or removing capacity from the resource instance. FIG. 2 shows the PRMSs, DB2 213, Linux 215, and Web Site 217. The PMRS is described in detail in invention entitled "Componentized Automatic Provisioning and Management of Computing Environments for Computing Utilities", having Ser. No. 10/587,615.

The middle layer of FIG. 2 is the Base Resource Distribution Service (BRDS) 219. Its job is to allocate the resources of the service provider to its domains in an effective way, based on the agreements that the service provider has in force for each of its domains. Domains are hierarchically organized, some domains are sub domains of others. The BRDS specifies which sets of resources are available to which domains and automatically redistributes those resources based on business policies when resources are constrained It interacts with both the computing environments 211 (PMRSs) and resources 201 (BRLSs). A resource may be allocated to a computing environment either immediately or in the future. The promise of a future resource allocation is a reservation. This invention assumes that the resources allocated to a computing environment are dedicated to that computing environment for the duration of their allocation.

Base Resource Library Service

Resources reside in pools, which may be arranged by type. Resource pools may be public or private. A public resource pool is a resource pool from which any domain may allocate a resource. A private resource pool is restricted to a subset of customer domains. Private pools are used to dedicate resources to a subset of customer domains. For example, a private pool could hold resources for use in multiple domains on behalf of a single customer. Such a pool might also be used for resources the customer owns but wishes the service provider to manage for it. Every resource has a home pool from which it originates, which may be either public or private. The home pool does not change when a resource is allocated or reserved. A group of unallocated resources is called a free pool.

Figure 3:
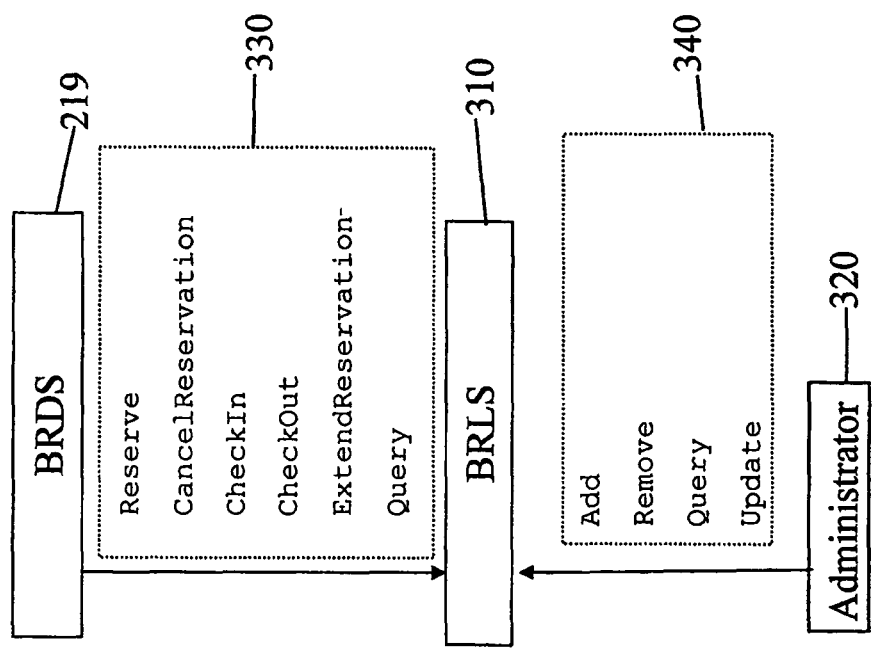
FIG. 3 shows the operations of a library component in a computing utility management system in accordance with the present invention.

FIG. 3 shows an example of an operation of a Base Resource Library Service 310 (BRLS). Every base resource in the system is represented by a library, or BRLS 310, which provides information such as cataloging, check out (allocation), check in (deallocation), and advance reservation. A BRLS serves as a home pool for instances of a resource type, and it may be either public or private (represent a public resource pool or a private resource pool). Each BRLS 310 is associated with a collector. Every BRLS 310 has two types of interfaces, Resource Operations 330 which are used by the system to, acquire, reserve, and return resources and Catalogue operations 340 which are used manage the resources available to a BRDS 219. The Resource Operations 330 provided are Reserve, CancelReservation, CheckIn, CheckOut, ExtendReservation, and Query.

Reserve(num-instances, selection-spec, start time, duration)
→reservation-ids

This request is issued by BRDS 219 on behalf of a customer computing environment to reserve resources.

Inputs:
Num-instances is the number of instances desired
Selection-spec is a specification of desired attributes supported by the BRLS 310.

Start time, If unspecified, any instance may be used to satisfy the request.

Start time could be immediate or for an advance reservation

Outputs:

Reservation-ids[ ]. The elements are resource reservation tickets, one per resource instance, up to num-instances. These need not map to instances at the time of the reservation. In other words, the library may overbook its resources.

CheckOut (reservation-id)→resource-handle

This request is issued by BRDS 219 on behalf of a customer computing environment to allocate resources.

Inputs:

Reservation-id issued by Reserve

Outputs:

Resource-handle. An identifier of a resource instance. Set to a special value if an instance of the resource cannot be provided.

CheckIn (resource-handle)

This request is issued by BRDS 219 on behalf of a customer computing environment to return resources.

Inputs:

Resource-handle issued by CheckOut.

ExtendReservation (resource-handle, end time)

This request is issued by BRDS 219 on behalf of a customer computing environment to extend the reservation for a currently held resource.

Inputs:

Resource-handle issued by CheckOut.

End time: the point at which the resource will be returned.

Outputs:

Accept: Resource reservation can be extended.

Reject: Resource is returned.

Query (selection-spec)→availability-data

This request is issued by BRDS 219 on behalf of a customer computing environment to return resources.

Inputs:

Selection-spec is a specification of desired attributes supported by the BRLS 310.

It is used to restrict the scope of the query.

It may contain a resource handle to refer to a specific instance.

Outputs:

Availability-data[ ]. The elements are structures that indicate when instances are available for reservation.

CancelReservation (reservation-id)

This request is issued by BRDS 219 on behalf of a customer computing environment to cancel a reservation. After a cancellation is received, the resource is available to be assigned and checked out by another computing environment.

Inputs:

Reservation-id issued by Reserve

Catalog Operations

Catalog Operations 340 are provided for administrators 320 or other administrative mechanisms to modify the resource pools managed by the BRLS 310. Resource discovery mechanisms could also use these operations to automate this process. The operations provided include Add, Remove, Update, Query, and any combination of these operations.

Add (resource-identifier, instance-data)

This request is issued to add a resource instance to the BRLS 310.

Inputs:

Resource-identifier is a resource identifier, may or may not be the same as the handle above.

Instance-data is the collection of attribute values that can be used to select the resource via a selection-spec Remove (resource-identifier)

This request is issued to remove a resource instance from the BRLS 310.

Inputs:

Resource-identifier is the resource identifier

Query (selection-spec)→resource-identifier [ ]

This request is used to look up a resource instance registered with the BRLS 310.

Inputs:

Selection-spec is a specification of desired attributes supported by the BRLS 310.

It is used to restrict the scope of the query.

It may include a resource identifier.

Outputs:

Resource-identifier[ ] a list of resource identifiers that satisfy the selection-spec Query (resource-identifier)→instance-data This request is used to look up a resource instance registered with the BRLS 310.

Inputs:

Resource-identifier is the resource identifier

Outputs:

Instance-data is the collection of attribute values registered for this instance, if any Update (resource-identifier, update-data)→instance-data This request is used to modify a resource instance registered with the BRLS 310.

Inputs:

Resource-identifier is the resource identifier

Update-data new information to be applied to or registered about the resource

Figure 4:
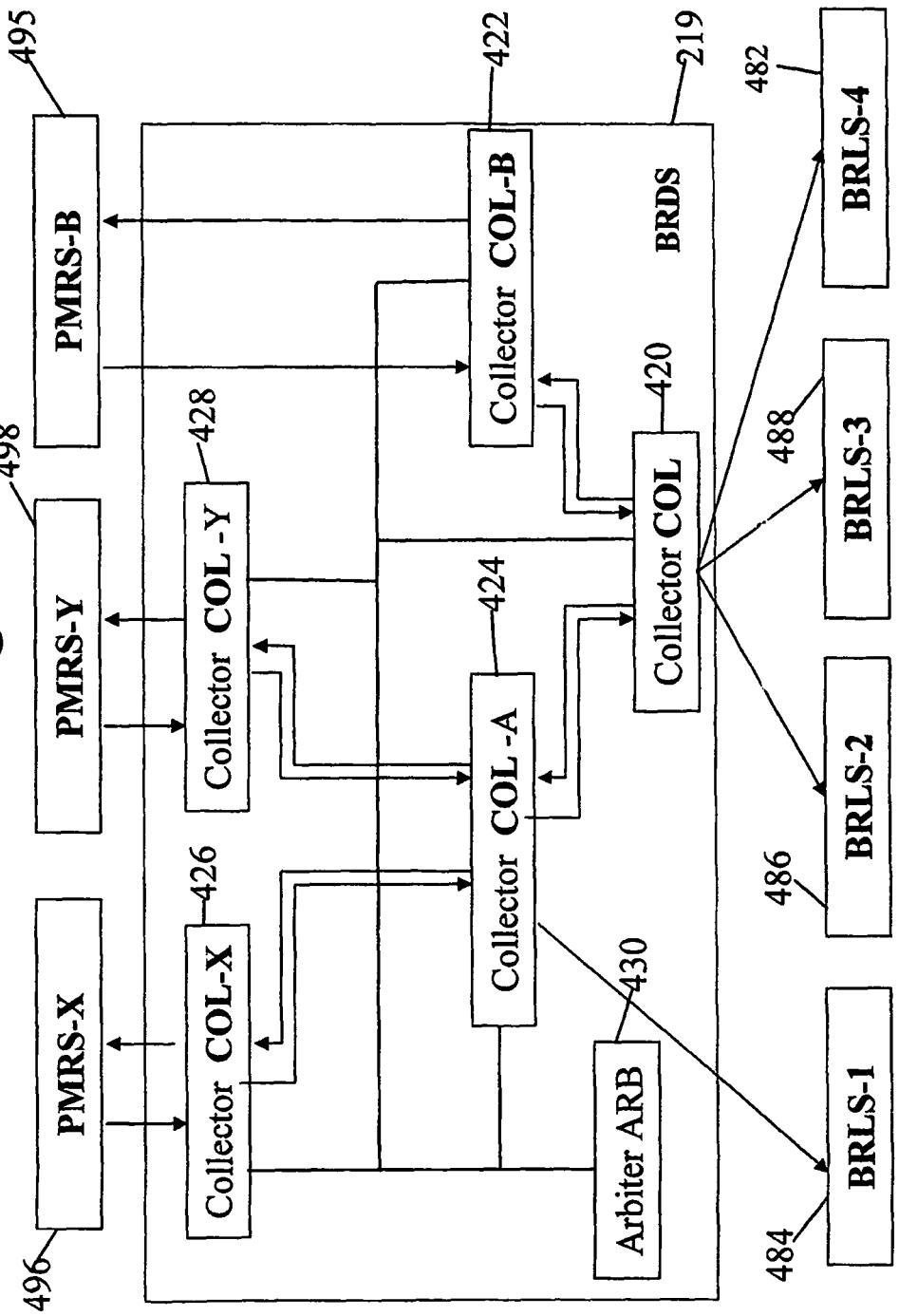
FIG. 4 shows a the hierarchy of collectors within a computing utility in accordance with the present invention.

Outputs:

Instance-data is the collection of attribute values registered for this instance, if any Base Resource Distribution Service FIG. 4 shows an example of components of a Base Resource Distribution service (BRDS) 219. The BRDS 219 determines how to distribute the base resources across the various computing environments. The BRDS 219 includes of two types of components, Collectors 420, 422, 424, 426, 428 and an Arbiter 430. A domain is associated with at least one collector. For every computing environment there is one collector which includes the policies previously mentioned, and the list or resources which are reserved for the computing environment.

Arbiter

The arbiter determines how resources are divided amongst the computing environments. It operates both on current and future allocations (reservations). Resources may be allocated to computing environments either reactively or proactively. The arbiter can be consulted when free resources are not sufficient to fulfill demands from customer computing environments. It can also be used on a periodic basis to optimize resource allocations. If resources are constrained, the arbiter may reclaim resources from computing environments. Details on the operation of the arbiter are in a separate invention entitled "Apparatus for Arbitration in a Computing Utility System", having Ser. No. 10/866,946.

Collector

A collector represents the set of resources allocated to one or more computing environments. The root domain of each computing environment has an associated collector. Collectors may be nested, for example, to represent departments within an organization. This structure enables resource sharing between a subset of computing environments, essentially replicating the computing utility model for those domains. A computing utility can provision resources for multiple organizations, a collector that is connected to multiple organizations (the root domain of each organization) is called the root collector. FIG. 4 shows one root collector 420 with two domains, one of which has two sub domains. The two main domains are Col-A 424 and Col-B 422 representing Company A and Company B. Col-A 424 has two sub domains Col-X 426 and Col-Y 428 representing Departments X & Y. There are three PRMSs shown in FIG. 4 PMRS-X 496, PRMS-Y 498, and PRMS-B 495. A collector is associated with each of these computing environments. In addition the BRDS 219 also has a collector 420.

Figure four also shows public and private resource pools. Public BRLSs are associated with a root collector in a BRDS 219. A private BRLS is associated with a collector other than a root collector of a BRDS 219. In FIG. 4, BRLSs 486, 488, and 482 are public because they are associated with the root collector 420 and BRLS 484 is private because it is associated with collector 424, which is not the root collector 420.

The collector implements the customer's acquisition policy, which determines under which circumstances to add or remove resources from its collection, or change the composition of a collection. The hierarchical structure of collector allows local (organization specific) policy governing resources to be specified. The simplest acquisition policy (i.e., no acquisition policy) is entirely request driven. That is, a resource moves between BRLS 482 (486, 488) and PMRS 495 through the collector hierarchy on every request and return. A more complex acquisition policy might specify minimum and maximum numbers of servers at each collector. These acquisition policies filter the request flow. Such an acquisition policy allows collectors to maintain a variety of free pools (caches of allocated or reserved resources) for its domain, in effect pre-allocating resources for predicted requests. Acquisition policy will be discussed in the description of FIGS. 7 & 8.

Each BRLS 482, 484, 486, 488 is associated with a collector. This association defines the scope of sharing for the resource pool represented by the BRLS. For example, if an organization wishes to have a private resource pool for its departments, it would have a BRLS 484 associated with the collector 424 of the organization as illustrated in FIG. 4. The resources would be available for allocation only by customer computing environments associated with the organization (i.e., associated with a collector that has the organization's collector as an ancestor).

Figure 4B:
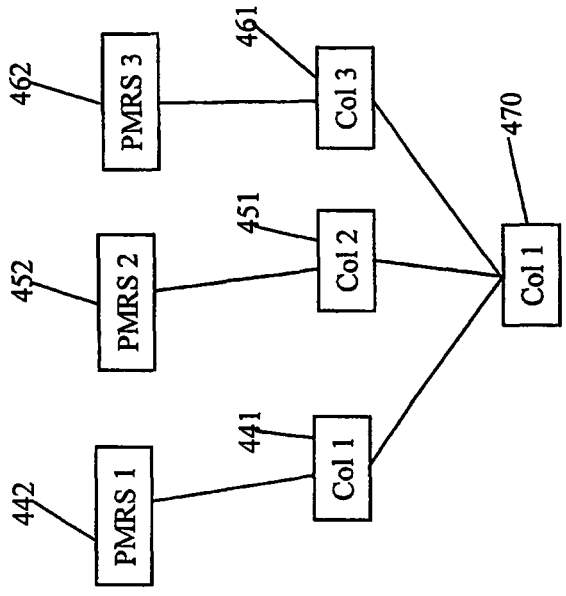
Figure 4A:
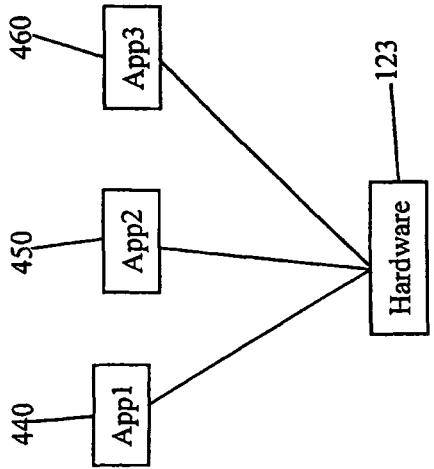

FIG. 4A shows a sub domain, Hardware 123, of the Smith Fastener company from FIG. 1A. For provisioning purposes Hardware has been assigned three applications, App1 440, App2 450, and App3 460. In this case all three application are allowed to share the same set of resources.

FIG. 4B shows how this decision on provisioning maps to a collector hierarchy. Col 1 470 is associated with Hardware 123. In addition each application has a PMRS and a collector associated with it. App1 440 has Col 1 441 and PMRS 1 442, App 2 has Col 2 451 and PMRS 2 452, and App3 has col 3 461 and PMRS 3 462. In this invention a PMRS is associated with at most one collector.

Figure 5:
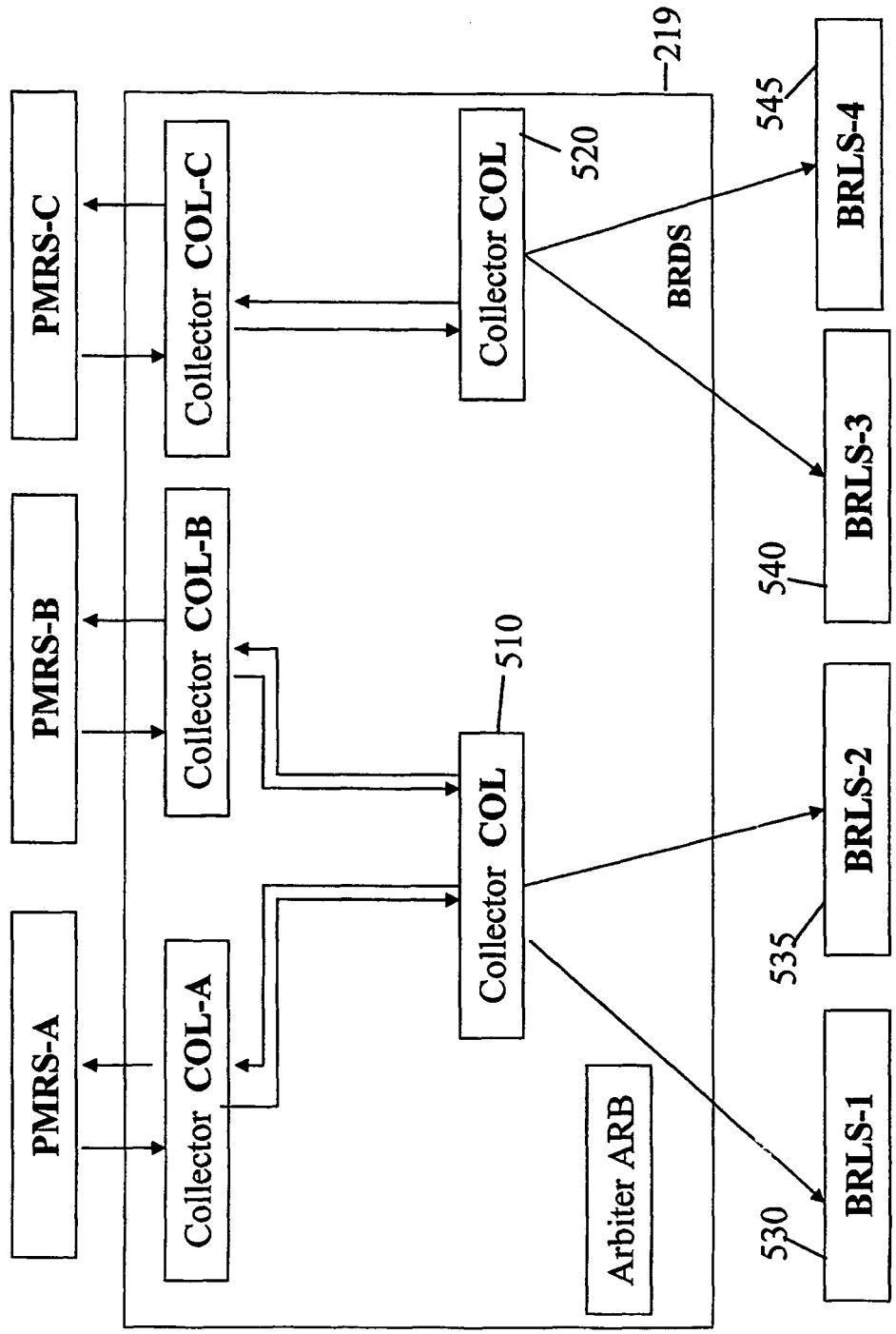
FIG. 5 shows a computing utility with multiple root collectors in accordance with the present invention.

FIG. 5 shows an example of a computing utility with multiple root collectors 510 and 520. This invention describes a BRDS 219 with a single root collector. Those skilled in the art can extend this invention to multiple roots by logically partitioning the resource pools and associating a BRLS for each partition with distinct root collectors. The BRLSs for the root collector could manage the same resource types. FIG. 5 illustrates this concept by showing a BRDS 219 with two root collectors 510 and 520. Root collector 510 has BRLSs 530 and 535. Root collector 520 has BRLSs 540 and 545. In this case BRLS 530 could be managing the same type of resources ad BRLS 540. Note that in an alternative implementation, BRLSs of the same type but different association can be represented as a single BRLS with constraints on where their resource instances may be assigned.

Figure 6:
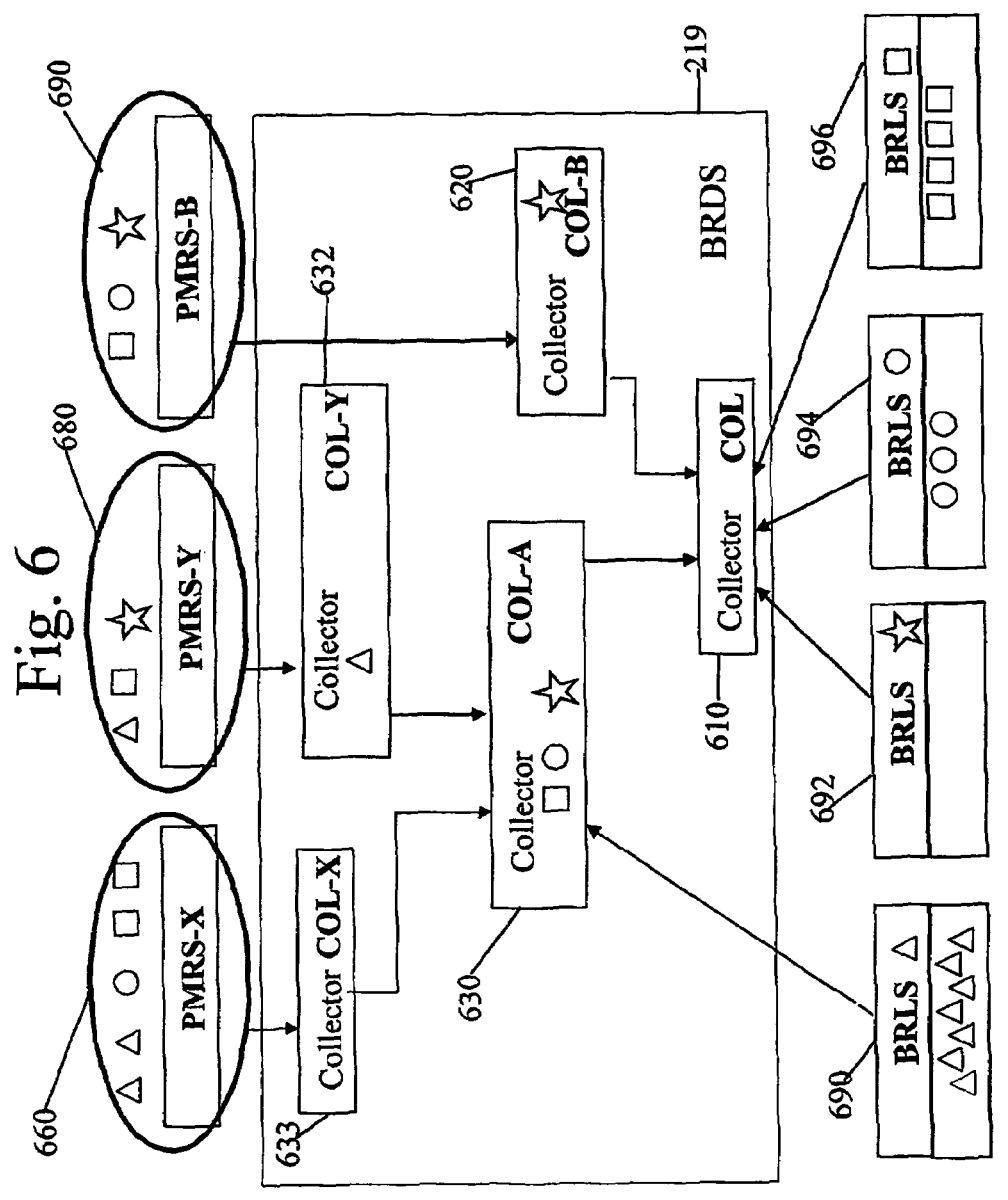

FIG. 6 illustrates an example of a collections and libraries. Each computing environment has a set of resources allocated to it. These are shown only in their corresponding PMRS 660, 680, and 690, not in collectors or their ancestors. Collector Col-Y 632 has an extra resource of type "triangle" allocated for use by computing environment Y. The home collection of the triangle is the private library BRLS-1 690. Triangles can only be allocated to PMRS X 660 and PMRS Y 680. Collector Col-A 630 has extra resources of type "square", "star", and "circle" for use by computing environments Col-X 633 or Col-Y 632. They are each from a public BRLS of the corresponding type 692, 694, and 696 respectively. These resource instances could be reclaimed for use by collector Col-B 620. BRLS 690 in FIG. 6 is private. Its resources are shared by collectors 630, 632, and 633. In FIG. 6 BRLSs 692, 694, and 696 are public.

When a resource is requested by a computing environment, the BRDS 219 goes through a three stage process. The first stage is determining whether or not the acquisition policies of the collector for the computing environment and its intermediate ancestor nodes, if any, would be satisfied if the request is granted. The BRDS 219 may deny the request if for example the resources requested would exceed that specified in the customer's agreement with the service provider. Thus the acquisition policy is a set of constraints that is taken into account in this decision process. If the BRDS 219 determines that a resource can be granted, the second stage of the process is to locate the instances which will satisfy the request. Available instances may be found in a public or private BRLS, or in a collector. If no instances are available, then an instance may be reassigned from another computing environment according to a distribution policy. If the request is for a set of resources, the BRDS 219 coordinates their allocation accordingly. If the request succeeds, a set of reservation tickets is returned to the PMRS.

The BRDS 219 will attempt to satisfy the acquisition policies of collectors, even in the absence of resource requests from the PMRS, generating requests to a BRLS if necessary. It is the BRDS 219 that makes reservations on behalf of a collector, whether it is provoked by acquisition policy or explicit resource requests.

Returning to the description of the collector and BRDS 219, when the start time of a reservation arrives, the BRDS 219 transforms the ticket into a resource handle. If the transformation of the reservation into a resource handle fails, the reservation cannot be honored. If the collector holding the ticket is associated with a PMRS, the BRDS 219 delivers the handle to the collector who then presents it to the PMRS. In FIG. 6 if collector 632 was holding a reservation ticket that became due, the BRDS would transform it into a resource handle which would be returned to collector 632 who would then pass the resource handle onto PMRS 680. The PMRS 680 can then configure the resource into the computing environment. Otherwise the collector holding the reservation is not associated with a PMRS so the BRDS 219 delivers the resource handle to the collector. In FIG. 6, this would occur if a reservation were held by collector 630.

When a reservation expires, the BRDS 219 reclaims the resource handle associated with it, and returns it to its lender (home pool or intermediate collector). The invariant maintained is that a resource is checked out of a home pool or lent by an intermediate collector if and only if there is a reservation for it (and presumably, a customer is being billed for it).

To extend a reservation, a PMRS 660 issues a request to the BRDS 219 with a selection specification for the resources it is already using. The BRDS 219, if acquisition policy and other commitments allow, will interact with the BRLS (692, 694, 696 or 690) to extend the reservation. That is, the PMRS 60 does not communicate with the BRLS directly.

When a resource is returned by the PMRS 660, the acquisition policy of its associated collector determines if it is returned to its parent. If the collector retains the resource, the client may continue to be billed for the resource. One advantage of retaining the resource is faster deployment on request. (For example, metering for the resource is already configured.) If it returns the resource, the acquisition policy of its parent is similarly checked. Resources are not retained at collectors associated with their home pool (BRLS); they are checked into their home pool in that case. For example if a resource associated with BRLS 690 were returned to collector Col-A 630, it would be returned to the BRLS 690 instead of being held at the collector.

Note that a collector that acts as a resource pool for a set of computing environments (i.e., an intermediate node in collector hierarchy) such as 630 in FIG. 6, requires the same functionality as a BRLS to distribute its resources. It is essentially a library that lends borrowed resources. As such, its resource collections can also be represented as BRLSs associated with it. The difference between a collector and a private BRLS is that resources may be reclaimed from a collector for use by its parent or other parts of the collector hierarchy (where ever the home BRLS of the resource allows it). In contrast, the resources in a private BRLS can only be used by its associated collector and its descendants. A collector can potentially have its own collection of every resource type known to the system. Like a private BRLS, an implementation of the collector's collections can be achieved within a single set of BRLSs, with constraints on where their resource instances may be assigned, and additionally, the identity of the collector that holds the reservation ticket for the resource from its home pool. Once a resource has been assigned to a collector or a PMRS, its location within the hierarchy becomes an attribute of the resource.

Figure 7:
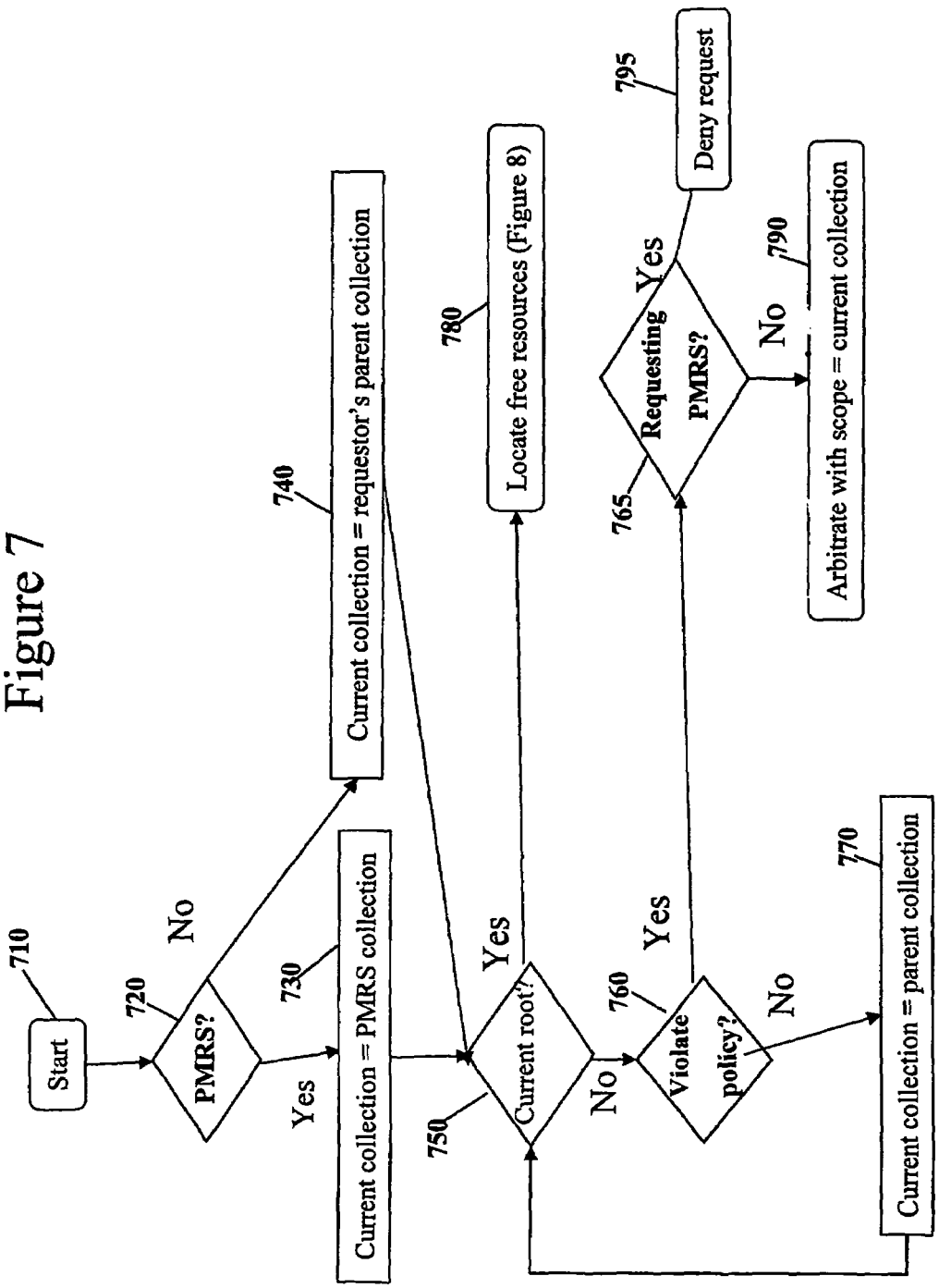
FIG. 7 show how acquisition policy is checked within a computing utility in accordance with the present invention.

FIG. 7 illustrates an example of a process of checking acquisition policies on resource requests, whether a request is generated by a PMRS or as a result of a collector's acquisition policy. The process starts in box 710. We first check 720 to see if the request is initiated by a PMRS. If it is 730 we set the current collection to be the PMRS so that acquisition policy checking begins with the collector associated with that PMRS. Otherwise 740 we set the current collection to be the requesting collector's parent. This is because the request was initiated by a collector whose acquisition policy requires more resources. Next we check 750 to see if we are at a root collector. If the policies are satisfied all the way to the root collector, then the resources can be obtained, and flow passes 780 to a procedure which attempts to locate available resources. Otherwise we check 760 see if the request would violate the acquisition policy of the current collection. If the policy would be violated then we check 765 to see if the requester is a PMRS. If it is the request is denied 795. Otherwise, it may be possible to satisfy the request using resources already allocated to the collector whose acquisition policy would be violated and its descendants, and arbitration 790 is called on the part of the sub tree rooted at the collector whose acquisition policy would have been violated. Returning to the check at 760, if the policy would not be violated at the current collection, then we set 770 current collection to the parent of the collection that was just examined and continue checking at 750.

Figure 8:
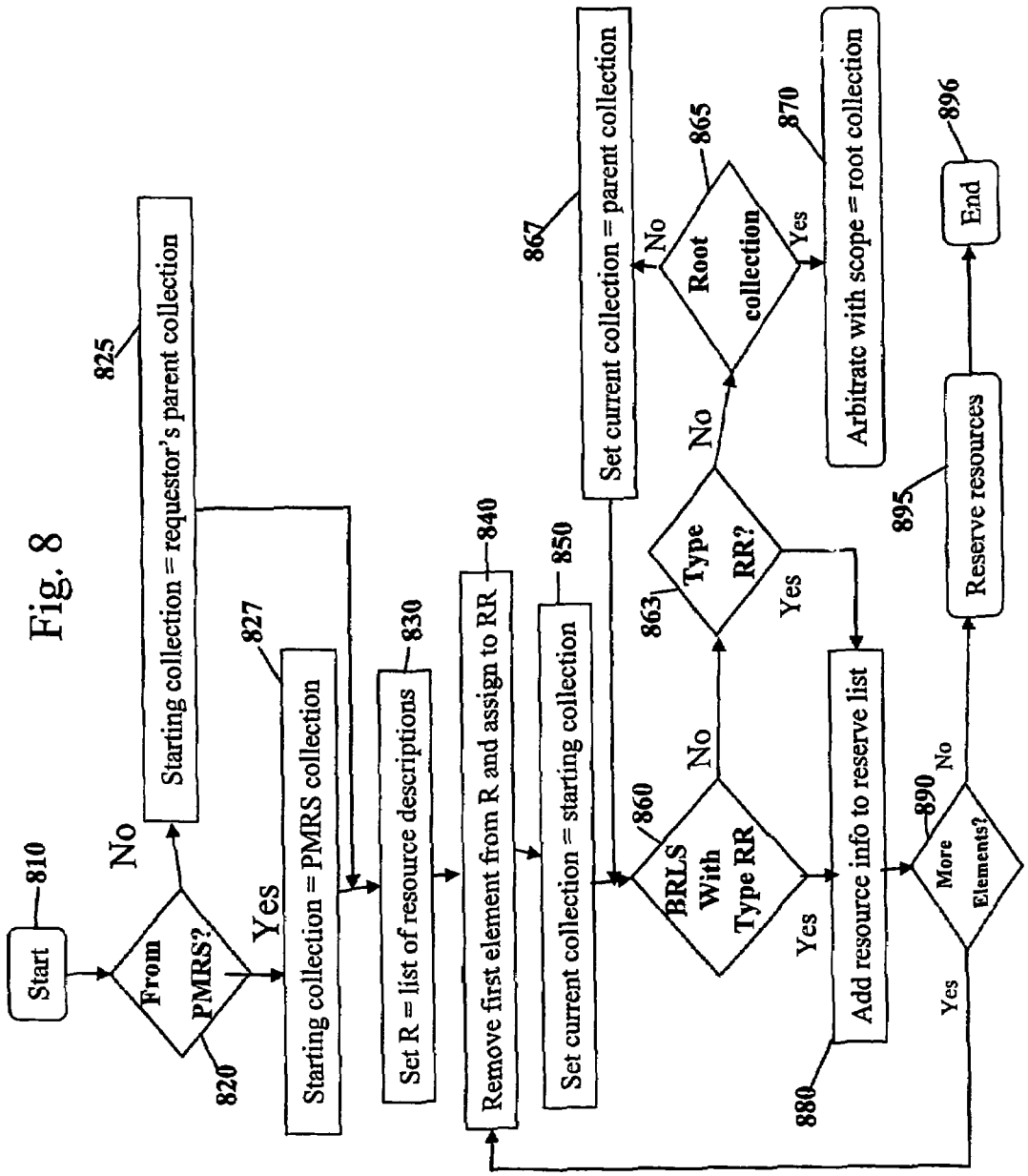
FIG. 8 show how to locate available resources within a computing utility.

FIG. 8 illustrates an example of a process of locating available resource. The process starts in 810. First the starting point of the search is determined. If the request originated from a PMRS 820, the starting collection for the search is the collector associated with the PMRS 827. Otherwise, it is the parent of the collector from which the request originated 825. Since a resource request may specify a set of resources of different types, a list of the descriptions of the desired resources is constructed 830, one element per resource type per instance. Those skilled in the art realize that there are multiple ways to form this list, such as one element per resource type with multiple elements of the same type being tracked within the element. For each element in the list, three alternatives are checked for resources: a private BRLS associated with the collector, the collector's collection, or a public BRLS (when the search reaches the root). These checks are repeated at each collector from the starting collector to a root. This is done by removing 840 the first requested resource RR, from the list of required resources. Beginning in step 850 with the starting collection, we check 860 to see if there is a BRLS with an available resource of type RR. If not we then check 863, to see if the collector has a resource of type RR. If not we check 865, to see if we are at the root collection. If we are not at the root, then we move 867 to the parent of the current collection and continue checking at 860. If we are at the root, then not all of the required resources are available and arbitration 870 will be used to determine if the resources can be made available. If check 860 or check 863 finds the resource, then information on the resource is added 880 to the reserve list. Next we check 890 to see if all requested resources have been located. If they have not been located then we get the top element off of the list 840 and continue looking for resources. If all resources have been located, then reservation requests 895 are made for the located resources and the result of the reservation request is returned as the end of the process to locate available resources.

If the reservation fails, arbitration will be called with the root collector as scope. Arbitration is the subject of a cross referenced application entitled "Apparatus for Arbitration in a Computing Utility System" having Ser. No. 10/866,946, the present invention treats arbitration as a "black box". If arbitration succeeds, the resources are reserved and tickets are returned to the requester. Otherwise, the request is denied. A successful arbitration may require resources to be reclaimed from other domains. The constraints imposed by the collection managers, associated libraries, and acquisition policies are input to the arbiter.

The BRDS provides the Resource Management operations listed below.

Resource Management Operations

Figure 9:
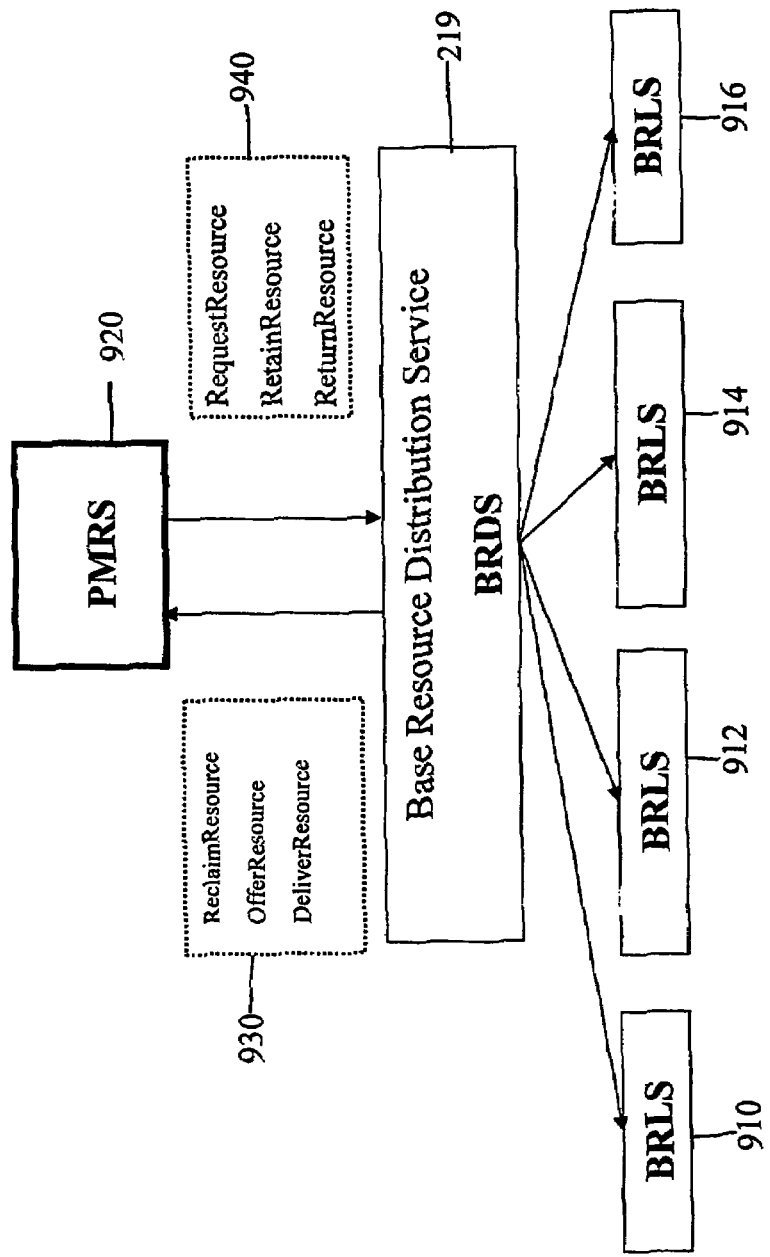
FIG. 9 shows the interaction between a Provisioned and Managed Resource Service (PMRS) and a Base Distribution Resource Service (BRDS) in a computing utility in accordance with the present invention.

FIG. 9 illustrates an example of the interactions between the BRDS 219 and the PMRS 920. There is one set of operations 930 for the BRDS to make requests of the PMRS and another set of operations 940 for the PMRS to make request of the BRDS. Allocation of resources involves five operations: the PMRS can request, retain, or return resources 940, and the BRDS can reclaim or offer resources 930. When a PMRS 920 needs additional resources or has excess to return it uses the RequestResource and ReturnResource interfaces 940. When the PMRS wants to keep resources beyond the duration specified on the initial request, it uses RetainResource 940. When resources that were previously reserved become available the BRDS 219 uses the DeliverResource interface 930 to give the resources to the PMRS 920. The reclaim resource interface 930 is used by the BRDS whenever it needs to remove resources from a PMRS. For example, one case would be revoking previously allocated resources so that they can be reallocated somewhere else. The OfferResource interface 930 is used to make available additional resources that were not explicitly requested by the PMRS 920 but are allowed with the policies of its computing environment.

RequestResource(R, start-time, duration)

This request is issued by the PMRS 920 to the BRDS 219 on behalf of a customer computing environment to request additional resources. The BRDS 219 can refuse the request.

Inputs:
R[ ], a vector of structures, one element for each resource type. Each structure contains the number of instances of the type and optional selection criteria. The selection criteria may include resource handles to specify particular instances.

Start time could be immediate or for an advance reservation

Outputs:
Return code indicating success or failure

R'[ ], an optional return. On failure, may be set to indicate resources available. The elements of R' are resource reservation tickets, one per resource instance, which the PMRS 920 may redeem to acquire the additional resources.

Start-time', an optional return. On failure, may be set to indicate when resources are available. Applies to R' if set, R otherwise.

ReturnResource (R)

This request is issued by the PMRS 920 to the BRDS 219 on behalf of a customer computing environment to return resources. The BRDS 219 accepts the resources.

Inputs:
R[ ] a list of resource identifiers (handles or reservation tickets) for the resources being returned. These resources could be currently allocated resources or reservations.

Outputs:
Return code indicating success or failure

Retain Resource(R, end time)

This request is issued by the PMRS 920 to the BRDS 219 on behalf of a customer computing environment to retain resources (extend or modify the reservation of resources) for a different amount of time from the previously committed time. The BRDS 219 may accept or reject the request.

Inputs:
R[ ] a list of resource identifiers (handles or reservation tickets) for the resources being retained. These resources could be currently allocated resources or reservations.

End time: is the requested new end time for the resources in the list. If the end time is not in the future the request is rejected.

Outputs:
Return code indicating success or failure

ReclaimResource(R)

This request is issued by the BRDS 219 to a PMRS 920 to revoke the allocation or reservation of a set of resources. The PMRS 920 relinquishes the resources.

Inputs:
R[ ], a vector of structures, one element for each resource type. Each structure contains the number of instances of the type and optional selection criteria. The selection criteria may include resource handles or reservation tickets to specify particular instances. The computing environment may select the resource instances to be reclaimed according to the criteria.

Outputs:
R'[ ] a list of resource identifiers (resource handles or reservation tickets) being returned. R' may be a superset of R which includes resources that would be rendered useless because of dependencies on reclaimed resources.

OfferResource(R, start-time, duration)

This request is issued by the BRDS 219 to a PMRS 920 to signal the availability of additional resources for this computing environment. The PMRS 920 may accept or decline the offered resources. To accept the resources the PMRS 920 issues a RequestResource request.

Inputs:
R[ ] a vector containing the number of instances of each resource type available Start time could be immediate or for an advance reservation Outputs:
None DeliverResource (R)

This request is issued by the BRDS 219 to a PMRS 920 to indicate that previously reserved resources have been allocated for the computing environment.

Inputs:
R[ ] a list of tuples, each consisting of a reservation-id and corresponding resource-handle.

Outputs:
None

To acquire and distribute resources to customer computing environment, the BRDS 219 invokes the operations of the BRLS 910, 912, 914, 916 described earlier.

Figure 10:
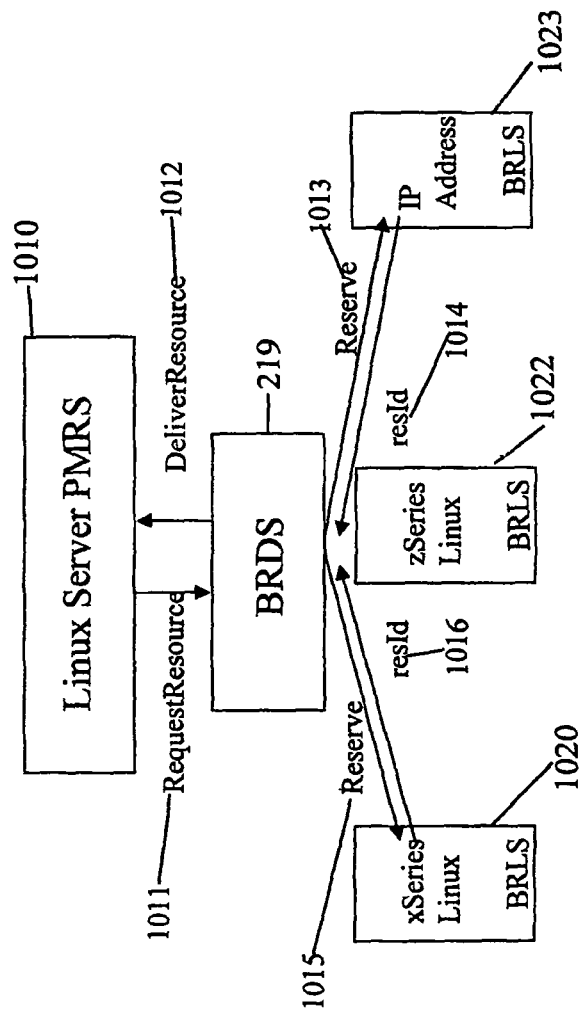
FIG. 10 show how a collector functions during the operation of a computing utility in accordance with the present invention.

FIG. 10 illustrates an example of the interactions between the PMRS 1010 and the BRDS 219 during normal operations. The PMRS in FIG. 10 represents a group of Linux servers which may be of variable size. Some event causes the PMRS 1010 representing the Linux server to realize that it needs additional resources, such as an xSeries Linux server and an additional IP address. It requests the resources from the BRDS 219 using RequestResource 1011. The BRDS 219 uses the methods described in FIGS. 7 and 8 to allocate and reserve the resources. The reservation tickets are returned to the PMRS 1010 in the response to RequestResource 1011. When the resources become available the PMRS 1010 will be informed using DeliverResource 1012. The detailed interactions inside of the PMRS 1010 are described in an application entitled "Componentized Automatic Provisioning and Management of Computing Environments for Computing Utilities", having Ser. No. 10/875,615.

Figure 11:
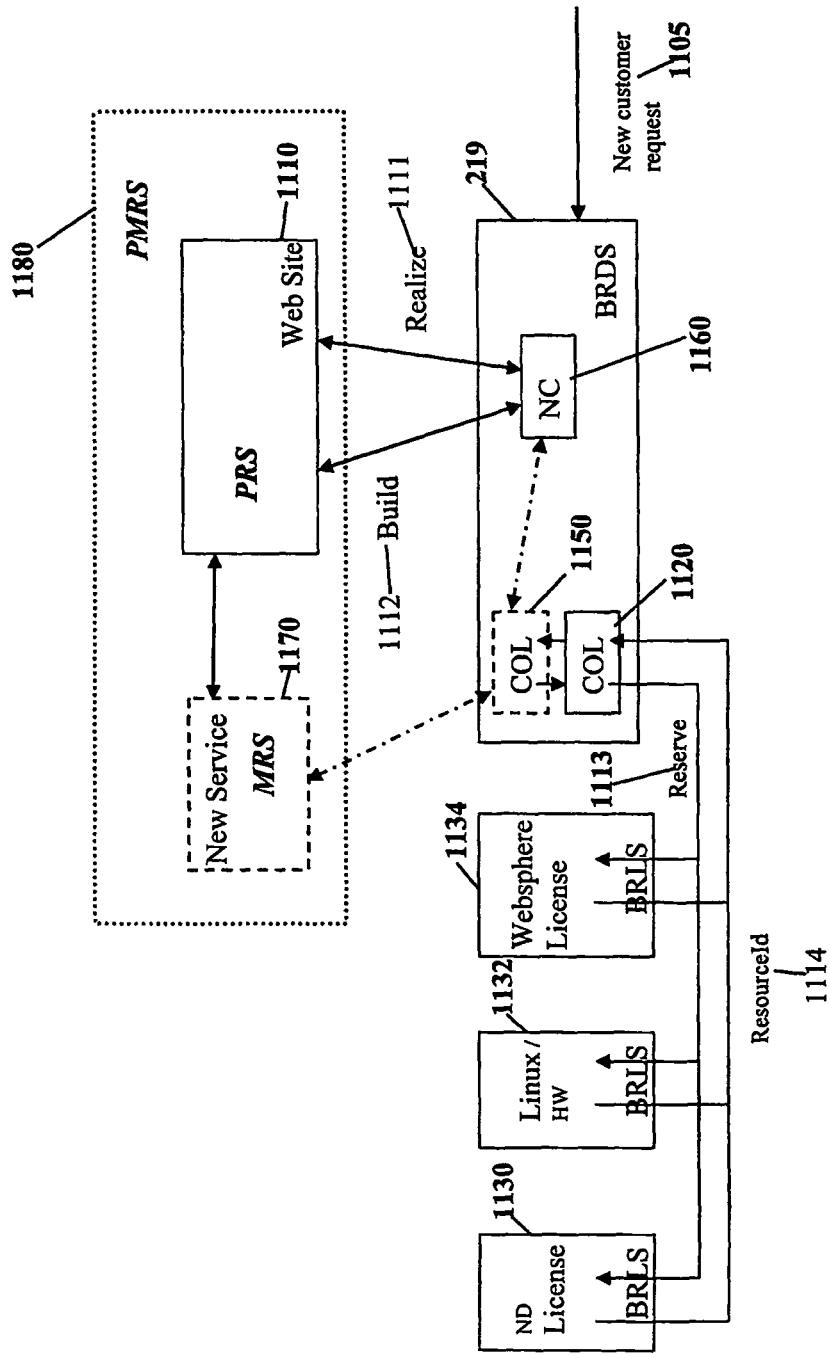
FIG. 11 Illustrates how a new service is added to a computing utility in accordance with the present invention.

FIG. 11 illustrates an example of a process of adding a new customer (or service) to an existing hosting infrastructure. This process is analogous to adding a new resource to an existing service. This invention assumes that there is a set of operations that allows organizations to subscribe to the services of the service provider, and further, to add computing environments in groups for resource sharing within an organization. At a minimum, to add an organization certain information from the agreement between the organization and service provider, such as the start time and duration of the agreement and acquisition or other polices is supplied. For specific computing environments, the computing environment type and settings are also supplied. During normal operations the policies controlling a computing environment can be modified by the addition of new policies, removal of existing policies, or the updating of existing policies. In addition, this invention assumes that there are operations to remove domains and organizations when their agreements terminate. To add a new domain the client specifies the representation of the domain (including sub domains), policies, and a list of computing environments to provisioned for the domain.

In FIG. 11 the computing environment type is a web site. The BRDS 219 has a single root collector. There are BRLSs for network dispatcher license 1130, Linux servers (hardware and software) 1132, and WebSphere license 1134. When the new customer request 1105 arrives, the new customer (NC) 1160 component of the BRDS 219 creates a new collector 1150 for it, (indicated by dotted lines) and a place holder for the customer's information until the PMRS 1180 for the new collection is fully operational. The new customer request 1105 specifics the exact composite resource that will be instantiated. After creating the new collector the NC 1160 sends a Realize 1111 request to the PMRS 1180 of the correct type. Realize is used by the BRDS 219 to get a set of possible plans for constructing a resource on the existing infrastructure when a new computing environment is requested. Realize is defined in detail in a separate invention entitled "Componentized Automatic Provisioning and Management of Computing Environments for Computing Utilities", having Ser. No. 10/587,615. At the end of the Realize 1111 request the BRDS 219 has list of possible sets of resources that can be used to build the computing environment of the specified type. All of these options are returned to the NC 1160 object which instantiates a collector 1150 to manage the new instance and request that the collector 1150 to negotiate for the resources. The newly instantiated collector 1150 (BRDS) analyses the options against the available resources, and policies and negotiates for resources with the libraries BRLSs 1130, 1132, 1134. It then schedules the construction of the service at the requested time assuming all of the resources can be acquired within policy. (If the resources cannot be acquired the new customer 1105 request fails.) When the start time of the resource reservations arrives, the BRDS 219 obtains the resources and delivers the resource handles to NC 1160, which sends a Build 1112 request to the PRS 1110. The Build request includes all required policies. One type of policy that is supplied is the acquisition policy, other required policies can be resource type specific and would be supplied at this time. It should be noted that a PMRS 1180 is the logical association of a PRS 1110 and an MRS 1170. The details of the PMRS are described in an application entitled "Componentized Automatic Provisioning and Management of Computing Environments for Computing Utilities", having Ser. No. 10/587,615. As a result of the Build 1112 request the PRS 1110 creates the MRS 1170 that will be associated with the computing environment. When this process completes the PRS 1110 returns the identifier of the new MRS 1170 to the NC 1160, the NC 1160 updates the collector 1150 with the identity of the root MRS 1170 for the computing environment.

Once the collector has the handle it is now associated with the newly instantiated service which it manages, as shown by the dashed line in FIG. 11. In an alternative embodiment, instead of having the NC send a build 1112 request to the PRS, the NC could send a DeliverResource request and the PMRS could realize that the first deliver resource request implies build.

In an alternate embodiment, the function of the NC can be combined into the collector so that the BRDS could instantiate the new collector when the new customer request arrives. The new collector would, as part of its initialization, go through all of the steps assigned to the NC. At the completion of those steps the NC would be done and the service operational. It is also possible that the hosted environment might not have the ability to satisfy the request, in which case the request for a new customer would be rejected. As indicated previously, this hosted environment has the ability to acquire and utilize resources that may be in some other hosted environment. Consequently, if this hosted environment does not have all of the resources required and it can obtain the resources from some other hosted environment with an acceptable set of conditions then the request for a new customer can be accepted instead of rejected. Resources obtained from another hosted environment would still be represented as a BRLS in this environment. When a hosted environment contains BRLSs that come from multiple hosted environments, the BRLSs are typed so that acquisition policies can be supplied to manage the use of external versus internal resources.

Figure 12:
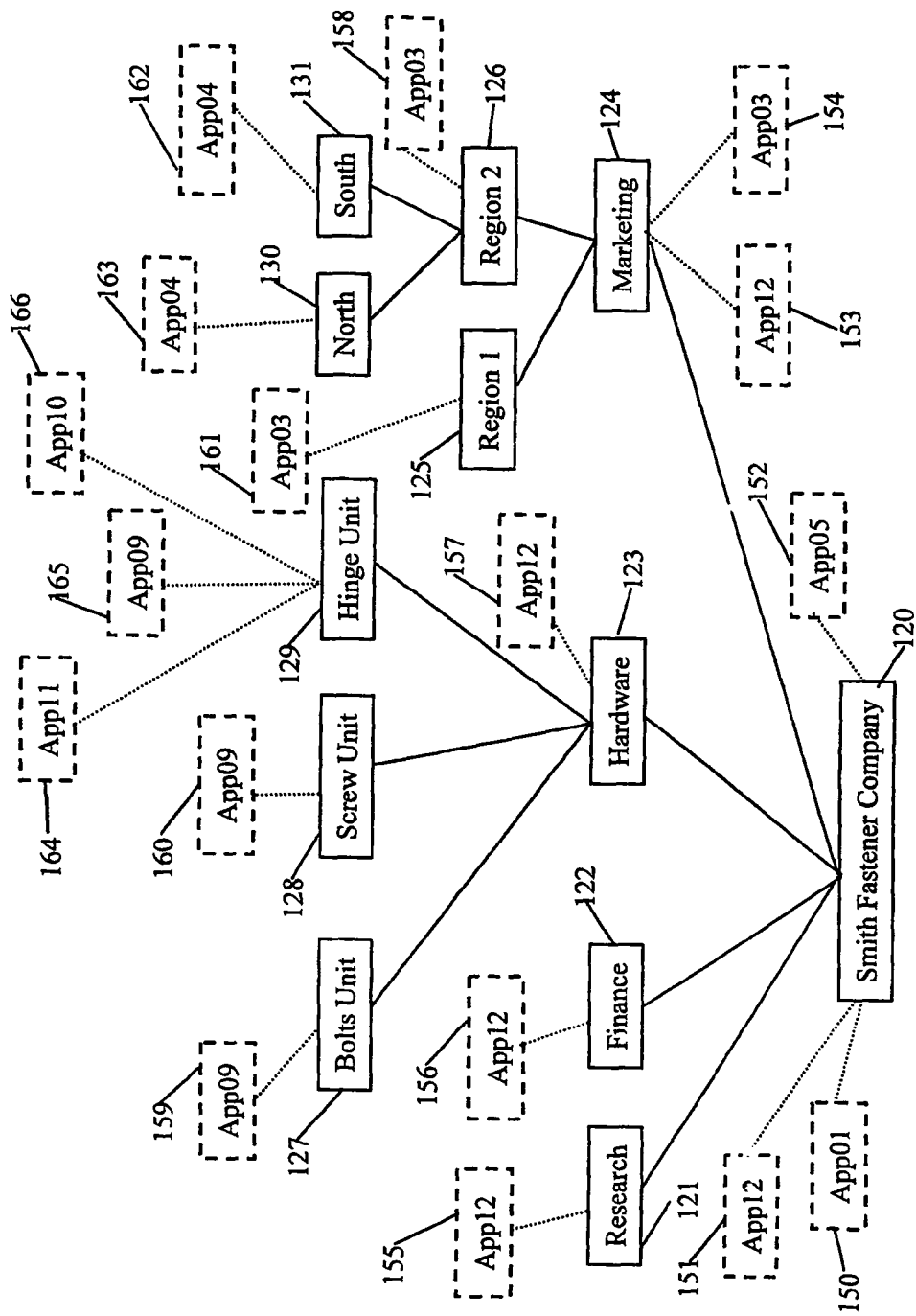
FIG. 12 Shows applications assignment within a company in accordance with the present invention.

FIG. 12 shows an example of a distribution for provisioning purposes of a set of computing environments to Smith Fastener company 120. Smith Fastener had to decide which services they wanted to utilize within their organization and which part of the organization would hold (or subscribe to) each service. Smith also had to decide how to allocate resources to their domains and what the allocation and distribution policy would be for each domain. These provisioning decisions are orthogonal to which employees of Smith Fastener get to use the services that are provisioned. The guiding principle in producing the domain and computing environment tree is that a domain is only inserted where the is at least one computing environment to be provisioned, at least two sub domains to be established, or there is at least one computing environment and one sub domain. This principle prevents long strings of domains with nothing other than one sub domain. Smith Fastener Company 120 has decided that it wants to provision and control two applications at the corporate level application 1 and application 5. An accounting application, application 12 is to be used by corporate and each division Research 121, Finance 122, Hardware 123, and Marketing 124. The hardware division has decided that each product unit Bolts 127, Screws 128, and Hinges 129 should use their own instance of the same engineering design application 9. The Hinge unit 129, is also experimenting with two additional applications application 10 and application 11. Marketing has decided that each of its regions Region 1, 125 and Region 2, 126 should use their own instance of the same application, application 3, for managing marketing activities. Region 2, 126 of marketing is divided into two separate areas North 130 and South 131. Each of these regions uses their own instance of application 4 to collect information to feed into application 3 at the regional level. The resource acquisition and distribution policies of Smith Fastener 120 assure that each of its major domains Research 121, Finance 122, Hardware 123, and Marketing 124 has the resources it needs to accomplish its tasks. In addition Marketing 124 and Finance 122 can have resources reallocated to them from other divisions, but not each other, during their peak end of quarter and end of year times. But they are not allowed to take so many resources as to disable the other divisions.

When all of these decisions are mapped to a domain structure with computing environments it looks as follows: The root domain 120, has three applications App01 150, App12 151, and App 05 152. The root domain 120 also has four sub domains Research 121, Finance 122, Hardware 123, and Marketing 124. The sub domains of Research 121 and Finance 122 each use a single application. In this case they each have separate instances of the same application App12 155 and App12 156. The present invention does not prohibit the sharing of a single instance of an application between domains from a user perspective. For example in FIG. 12 App01 could be used by both Research and Finance as well as the root domain. However, from a provisioning (and management of provisioning) perspective each instance of an application has a single point of provisioning within the organization. Returning to the detailed description of the figure. The Hardware domain 123 has three sub domains and a single application associated with it. The sub domains of Hardware 123 are Bolts Unit 127, Screw Unit 128, and Hinge Unit 129. The application associated with hardware is App12 157. The Marketing domain 124 has two applications and two sub domains associated with it. The application are, App12 153 and App03 154 and the domains are Region 1, 125 and Region 2, 126. Each of those regions has its own instance of App03. Region 1, 125 uses App03 161 and Region 2, 126 uses App03 158. Region 2, 126 is further divided into North 130 and South 131 and each sub domain of Region 2, 126 has its own copy of App04 North uses App 04, 163 and South uses App04, 162.

Figure 13:
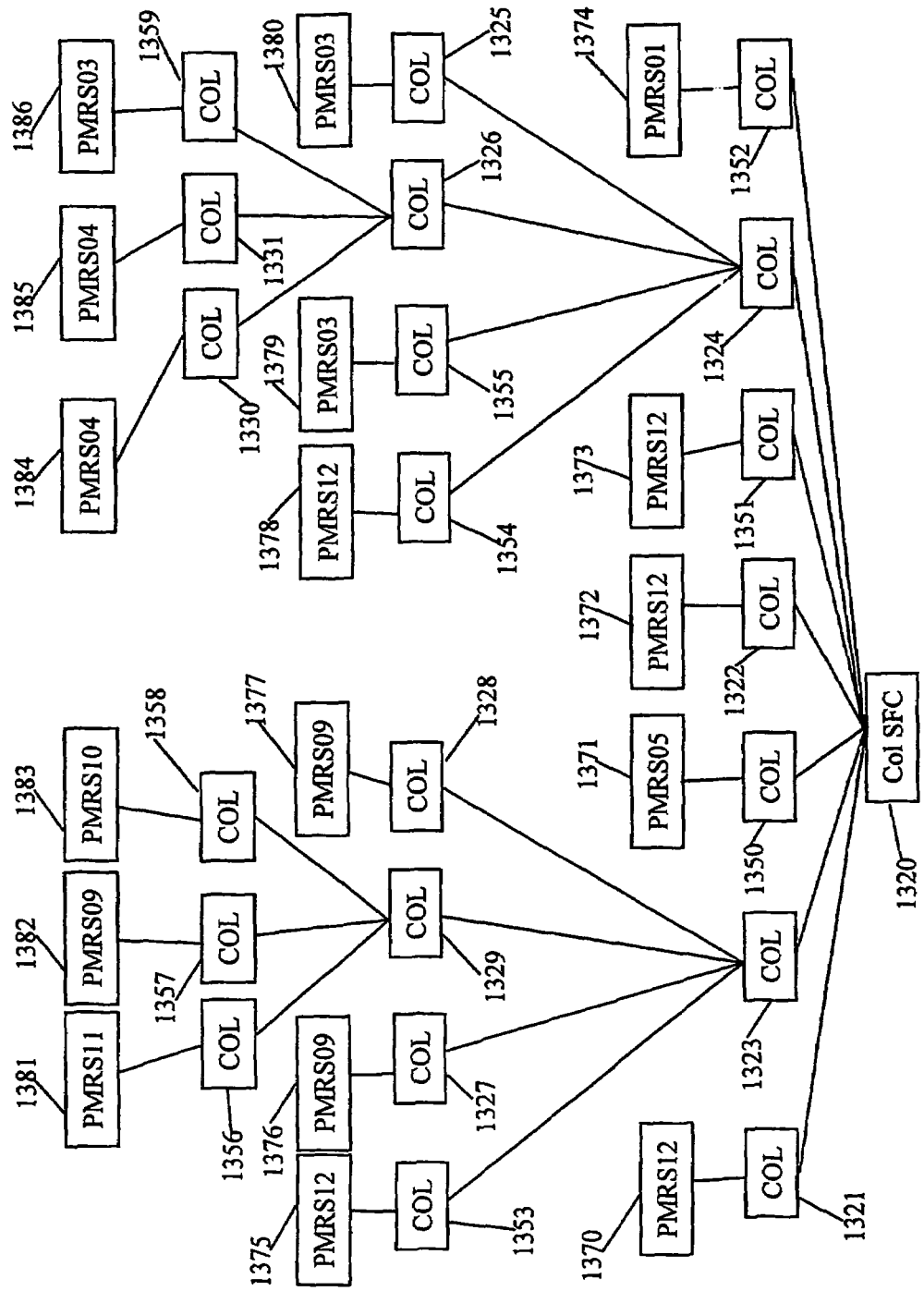
FIG. 13 shows the collector hierarchy associated with the assignment of FIG. 12, in accordance with the present invention.

FIG. 13 shows the collector hierarchy that results from the computing environment and domain structure of FIG. 12. To produce the collector hierarchy we start at the root domain and insert a collector. Next we examine the root domain of the domain tree it to see if there is only one computing environment, if there is then we insert a PMRS for this computing environment and we are done. Otherwise, the root domain has more than one computing environment or sub domain. For each computing environment of the root domain we insert a collector and PMRS. The remaining sub domains are placed on the domain processing list. This algorithm is applied to each domain on the domain processing list until it is empty. Basically this algorithm is used breadth first search starting at the root domain of the domain and computing environment tree. When this algorithm is applied to FIG. 12 the collector hierarchy show in FIG. 13 results. PMRSs are typed, in FIG. 13 the last two digits of the PMRS name are its type so PRMS01 is a PMRS which manages an instance of App01 from FIG. 12. Returning to a more detailed description of FIG. 13, Collector SFC 1320 is inserted because Smith Fastener Company 120 in FIG. 12 has more than one application. In FIG. 12 Smith Fastener 120 has three applications. Therefore applications 1, 12, and 5 a collector PMRS structure was inserted. For application 1 this is collector 1352 and PMRS01 1374, for application 12 this is collector 1351 and PMRS12 1373, and for application 5 this is collector 1350 and PMRS05 1371. Next we apply the algorithm to Smith's sub domains. We notice that tow of the sub domains in FIG. 12 Research 121 and Finance 122 only have a single application, application 12. Consequently for each of these sub domains a collector and PMRS structure is inserted into the hierarchy. For Research 121 in FIG. 12 collector 1321 and PRMS12 1370 in inserted and for Finance 122 in FIG. 12 collector 1322 and PMRS12 1372 is inserted. In FIG. 12 Hardware 123 and marketing 124 have multiple sub domains and application. Next we apply the algorithm to the sub domains of Hardware and Marketing. For hardware collector 1323 is inserted and for Marketing collector 1324 is inserted. In FIG. 12 hardware has three sub domains Bolts 127, Screws 128 and Hinges 129 and one application, application 12 associated with it. So a PMRS collector hierarchy is added to collector 1323 for the application. In FIG. 12 two of Hardware sub domains have only a single application associated with them Bolts 127 and screws 128. In FIG. 13 a collector PMRS structure is associated with each of these sub domain. For Bolts it is collector 1327 and PMRS04 1376 and for screws it is collector 1328 and PMRS09 1377. In FIG. 12, the third unit of Hardware 123, Hinges 129 has three applications associated with it so in FIG. 13 collector 1329 is inserted. In FIG. 12 marketing has two applications and two sub domains. These application are App12 153 and App03 154 and the sub domains are Region 1, 125 and Region 2, 126. In FIG. 13 we have inserted a collector PMRS hierarchy for each of the applications. These are collector 1354 and PMRS12 1378 for application 12 and collector 1355 and PMRS03 1379 for application 3. In FIG. 12 one sub domain, North 130 has only a single application associated with it, App04 163. In FIG. 13 a collector PMRS hierarchy is inserted. This is collector 1330 and PMRS04 1384. In FIG. 12 the other sub domain of marketing, Region 2 126 has an application and two sub domains. Consequently in FIG. 13 a collector is inserted collector 1326. Returning to Hinges 129 in FIG. 12, it has three applications associated with it App11 164, App09 165, and App10 166. In FIG. 13 A collector PMRS hierarchy is inserted for each of these applications. These are collector 1356 and PMRS11 1381 for application 11; collector 1357 and PMRS09 1382 for application 9; and collector 1358 and PMRS10 1383 for application 10. Finally we examine Region 2 126 in FIG. 12. It has one application App03 158 and two sub domains. In FIG. 12 each of its sub domains North 130 and south 131 has an instance of application 4. In FIG. 13 we insert a PMRS collector hierarchy for application 3, collector 1359 and PMRS03 1386. For the sub domains we also insert a collector PMRS hierarchy for each one because they only have one application. This is collector 1330 and PMRS04 1384 for North and collector 1331 and PMRS04 1385 for South. This completes construction of the collector computing environment hierarchy which will be used to provide hierarchical management of resources by this invention.

The collector tree is designed to allow maximum flexibility in provisioning services to a customer. It allows private BRLSs to be associated with each collector in the tree. Each collector can have its own acquisition and distribution policies. This allows the company, in this case Smith Fastener, the ability to more finely control the distribution of its computing resources. If all acquisition and distribution policies are identical and all resources are held in Public BRLSs then this tree is unnecessary and a flat tree would be sufficient. By using a hierarchy, a finer level of control is obtained over the distribution and use of resources within an organization.

The present invention is useful with the inventions described in the above cross-referenced applications entitled "Componentized Automatic Provisioning and Management of Computing Environments for Computing Utilities", and entitled "Apparatus for Arbitration in a Computing Utility System". One example of a use is to combine the inventions to provide on-demand services to a set of customers.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and application. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method comprising providing an automatic hierarchical management of a computing infrastructure for at least one domain for an entity, said step of providing hierarchical management comprising:

obtaining a hierarchical representation of said at least one domain, wherein the at least one domain comprises a plurality of sub-domains and said hierarchical representation including:

a list of computing environments to be managed, at least one policy controlling acquisition of at least one resource from resource libraries for said at least one domain, and the plurality of sub-domains the at least one policy for controlling the number of reserve resources available to process requests from the at least one domain and the sub-domains, the resources and reserve resources comprising a reserve pool of resources pre-allocated for handling requests for the at least one sub-domain and a free pool of resources for handling requests for any of the plurality of sub-domains;

receiving at least one request for resources from said at least one sub-domain, wherein the at least one request includes a request for an amount of resources that exceeds an available amount of resources in the reserve pool and the free pool; and accepting the at least one request based on an expectation that additional resources will be acquired in time for allocation, wherein at least one of the allocated resources is not available at a time of the reservation is made.

2. A method as recited in claim 1, further comprising:

deriving a set of resources required for said list of computing environments in constructing said hierarchical management, and providing resources for said set of resources to said at least one domain.

3. A method as recited in claim 1, further comprising:

further comprising updating said at least one policy of the representation;

further comprising utilizing library services;

further comprising associating each computing environment with a particular sub-domain;

wherein the step of utilizing includes reserving a set of resources required by said list of computing environments:

further comprising acquiring the set of resources and using at least one resource from said set of resources;

wherein said at least one domain is a plurality of domains;

wherein at least one domain from said at least one domain is a sub domain of another domain;

further comprising associating at least one library service from said library services with at least one collector;

wherein both the quantity and types of base resources change over time, wherein said method is employed in providing service on-demand;

wherein said at least one resource is a base or composite resource;

further comprising organizing said at least one resource into a service offered to a plurality of customers;

further comprising allocating base resources to a library service;

further comprising formulating composite resources from base resources satisfying a service description;

further comprising allocating composite resources to a library service; and further comprising allocating services to a library service.

4. A method as recited in claim 3, wherein at least one of said at least one domain is a root domain.

5. A method as recited in claim 4, further comprising a requesting computing environment making a request for a particular combination of resources checking said representation of the acquisition policy of said requesting computing environment to verify that satisfaction of the request for the particular of resources is within the acquisition policy of said requesting computing environment; and repeating the step of checking for all parent collector of said requesting collector until any root collector is reached.

6. A method as recited in claim 5, further comprising determining if the acquisition policy is satisfied all the way to any root collector;

if the acquisition policy is satisfied the request is granted otherwise the request is denied.

7. A method as recited in claim 4, further comprising making a request for a particular combination of resources;

determining a starting collector to start a search for the combination of resources;

checking if the starting collector has at least one resource from said combination of resources, said at least one resource being a located resource;

checking if there is at least one library which includes at least one resource from said combination of resources, said at least one resource being a located resource;

repeating the step of checking at each collector from a starting collector to any root collector;

if all resources of said combination are located resources reserving all located resources, otherwise denying the request.

8. A method as recited in claim 7, further comprising calling arbitration to continue locating all resources from said combination of resources.

9. A program storage device readable by machine, tangibly embodying a program of instructions executable by the machine to perform method steps for providing hierarchical management of at least one domain for a computing utility, said method steps comprising the steps of claim 1.

10. An article of manufacture comprising a non-transitory computer readable storage medium tangibly storing instructions, which when executed by a computer implement provisioning of hierarchical management of at least one domain for a computing utility, the computer readable program code means in said article of manufacture comprising computer readable program code means for causing a computer to effect the steps of claim 1.

11. An apparatus comprising means for providing hierarchical management of at least one domain for a computing utility, said means for providing hierarchical management comprising:

means for obtaining a hierarchical representation of said at least one domain, wherein the at least one domain comprises a plurality of sub-domains and said representation including:

a list of computing environments to be managed, at least one policy controlling acquisition of at least one resource from composite resources for said at least one domain, and of the plurality of sub-domains the at least one policy for controlling the number of reserve resources available to process requests from the at least one domain and the sub-domains, the resources and reserve resources comprising a reserve pool of resources pre-allocated for handling said predicted at least one request for the at least one sub-domain and a free pool of resources for handling a request for any of the plurality of sub-domains;

means for receiving at least one request for resources from said at least one sub-domain, wherein the at least one request includes a request for an amount of resources that exceeds an available amount of resources in the reserve pool and the free pool; and accepting the at least one request based on an expectation that additional resources will be acquired in time for allocation, wherein at least one of the allocated resource is not available at a time of the reservation is made.

12. An architecture for a computing utility comprising an apparatus to provide at least one service for a plurality of clients, said apparatus comprising:

a Base Resource Distribution Service configured to allocate a plurality of resources to said at least one service, the plurality of resources comprising a free resource pool comprising one or more resources for handling requests for any of a plurality of clients and a reserve resource pool comprising one or more resources pre-allocated for handling requests for a first client;

said Base Resource Distribution Service having at least one collector;

at least one Provisioned and Managed Resource Service coupled to said Base Resource Distribution Service to provision and manage said resources for said at least one service; and at least one Base Resource Library Service coupled to said Base Resource Distribution Service to provide reservation and allocation of resources, said Base Resource Distribution Service configured to provide a reservation of resources in excess of currently available resources in the computing utility based on an expectation that additional resources will be added to the computing utility in time for allocation.

13. An architecture as recited in claim 12, wherein said Base Resource Distribution Service comprises:

at least one collector, each collector anchoring a representation of a particular domain and holds polices of said particular domain and holds resources reserved for said particular domain; and an arbiter coupled to said base resource distribution service and available to each of said collectors, said arbiter provides dynamic resource allocation to each collector of said computing utility.

14. An architecture as recited in claim 12, wherein the architecture is used by an on-demand service.

* * * * *